(12) United States Patent
Czanta et al.

(10) Patent No.: US 8,221,854 B2
(45) Date of Patent: Jul. 17, 2012

(54) LIQUID CRYSTALLINE MEDIUM AND LIQUID CRYSTAL DISPLAY

(75) Inventors: Markus Czanta, Darmstadt (DE); Andreas Taugerbeck, Darmstadt (DE); Renate Bender, Darmstadt (DE); Lars Lietzau, Darmstadt (DE)

(73) Assignee: Merck Patent Gesellschaft MIT Beschränkter Haftung, Darmstadt (DE)

( * ) Notice: Subject to any disclaimer, the term of this patent is extended or adjusted under 35 U.S.C. 154(b) by 0 days.

(21) Appl. No.: 12/597,474

(22) PCT Filed: Apr. 1, 2008

(86) PCT No.: PCT/EP2008/002584
§ 371 (c)(1),
(2), (4) Date: Oct. 23, 2009

(87) PCT Pub. No.: WO2008/128623
PCT Pub. Date: Oct. 30, 2008

(65) Prior Publication Data
US 2010/0127213 A1     May 27, 2010

(30) Foreign Application Priority Data

Apr. 24, 2007   (DE) .......................... 10 2007 019 671

(51) Int. Cl.
*C09K 19/34*    (2006.01)
*C09K 19/30*    (2006.01)
*C09K 19/12*    (2006.01)

(52) U.S. Cl. ............... 428/1.1; 252/299.61; 252/299.63; 252/299.67

(58) Field of Classification Search ............. 252/299.61, 252/299.63, 299.66; 428/1.1; 546/282.1, 546/282.4, 326, 339; 544/242, 298, 334, 544/335
See application file for complete search history.

(56) References Cited

U.S. PATENT DOCUMENTS

| | | | |
|---|---|---|---|
| 6,326,065 B1 * | 12/2001 | Haseba et al. | 428/1.1 |
| 7,074,462 B1 * | 7/2006 | Bremer et al. | 428/1.1 |
| 7,105,210 B2 * | 9/2006 | Heckmeier et al. | 428/1.1 |
| 7,767,277 B2 * | 8/2010 | Lietzau et al. | 428/1.1 |
| 2004/0173776 A1 * | 9/2004 | Heckmeier et al. | 252/299.63 |
| 2008/0132716 A1 * | 6/2008 | Lietzau et al. | 549/374 |
| 2010/0127212 A1 * | 5/2010 | Lietzau et al. | 252/299.61 |
| 2010/0237285 A1 * | 9/2010 | Lietzau et al. | 252/299.6 |

FOREIGN PATENT DOCUMENTS

| | | |
|---|---|---|
| CN | 101 506 330 A | 8/2009 |
| DE | 195 28 107 A1 | 9/1996 |
| DE | 102007033584 A1 * | 2/2008 |
| EP | 1 006 109 A | 6/2000 |
| EP | 1 454 975 A | 9/2004 |
| JP | 2010 500383 A | 1/2010 |
| KR | 2009 0040471 A | 4/2009 |
| WO | WO 2008 019743 A1 | 2/2008 |

OTHER PUBLICATIONS

International Search Report of PCT/EP2006/002584, Date of Completion Jun. 12, 2008, Date of Mailing Jun. 19, 2008.
Merck Patent GMBH, "In-plane-switching electro=optical LCD with short switching times," Espacenet, Publication Date: Sep. 19, 1996; English Abstract of DE-195 28 107.
Merck Patent GMBH, "New cyclohexene-compounds useful as a component in a liquid crystal medium," Espacenet, Publication Date: Feb. 21, 2008; English Abstract of DE-10 2007 033584.

* cited by examiner

Primary Examiner — Shean Wu
(74) Attorney, Agent, or Firm — Millen, White, Zelano & Branigan, P.C.

(57) ABSTRACT

The present invention relates to dielectrically positive liquid-crystalline media comprising a dielectrically positive component, component A, comprising a dielectrically positive compound of the formula I

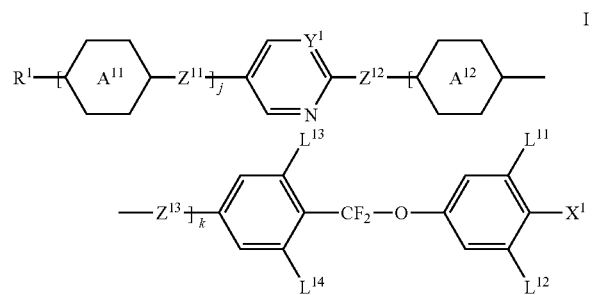

in which the parameters have the meaning indicated in the specification, and optionally a second dielectrically positive component, component B, comprising one or more dielectrically positive compounds having a dielectric anisotropy of great than 3, and optionally a dielectrically neutral component, component C, and to liquid-crystal displays containing these media, especially active-matrix displays and in particular TN, IPS and FFS displays.

20 Claims, No Drawings

LIQUID CRYSTALLINE MEDIUM AND LIQUID CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is substantially perpendicular to the substrates or the liquid-crystal layer. Besides these modes, there are also electro-optical modes that urilise an electric field which is substantially parallel to the substrates or the liquid-crystal layer, such as, for example, the in-plane switching (IPS) mode (as disclosed, for example, in DE 40 00 451 and EP 0 588 568) and the fringe field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and are intended for use in displays for TV sets and multimedia applications. The liquid crystals according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The response times in particular have to be improved for many types of application. Thus, liquid-crystalline media having lower viscosities ($\eta$), especially having lower rotational viscosities ($\gamma_1$), are required. The rotational viscosity should be 80 mPa·s or less, preferably 60 mPa·s or less and especially 55 mPa·s or less. Besides this parameter, the media must have a nematic phase range of suitable width and position and an appropriate birefringence ($\Delta n$), and the dielectric anisotropy ($\Delta\epsilon$) should be sufficiently high to allow a reasonably low operating voltage. $\Delta\epsilon$ should preferably be greater than 3 and very preferably greater than 4, but preferably not greater than 15 and in particular not greater than 12, as this would prevent an at least somewhat high resistivity.

The displays according to the present invention are preferably addressed by an active matrix (active matrix LCDs, AMDs for short), preferably by a matrix of thin film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 029, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes according to the present invention preferably use an electric field which is substantially parallel to the composite layer.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have severe disadvantages. Amongst other deficiencies, most of them result in disadvantageously long response times, have inadequate values of the resistivity and/or require excessively high operating voltages.

Thus, there is a considerable need for liquid-crystalline media having suitable properties for practical applications, such as a wide nematic phase range, suitable optical anisotropy $\Delta n$ corresponding to the display mode used, a high $\Delta\epsilon$ and particularly low viscosities.

Present Invention

Surprisingly, it has now been found that it is possible to achieve liquid-crystalline media having a suitably high $\Delta\epsilon$, a suitable phase range and $\Delta n$ which do not exhibit the disadvantages of the materials from the prior art, or at least only do so to a significantly lesser extent.

These improved liquid-crystalline media according to the present application comprise at least the following components:

a first dielectrically positive component, component A, comprising one or more dielectrically positive compounds of the formula I

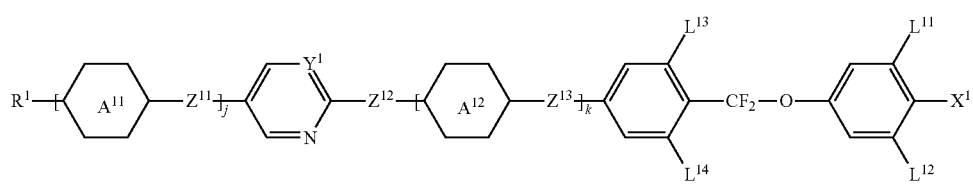

in which $R^1$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl, $X^1$ denotes —CN, halogen, halogenated alkyl or halogenated alkoxy having 1 to 3 C atoms or halogenated alkenyl or halogenated alkenyloxy having 2 or 3 C atoms, preferably F, Cl, —OCF$_3$, —CF$_3$ or —O—CH=CF$_2$, more preferably F, Cl or —OCF$_3$ and very preferably F, $Y^1$ denotes =N—, =(CH)— or =(CF)—,

independently of one another and, if the rings $A^{11}$ and/or $A^{12}$ are present more than once, also these independently of one another, denote

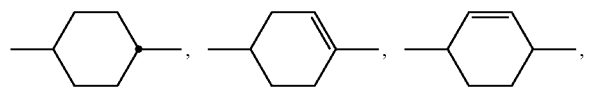

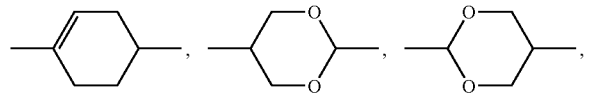

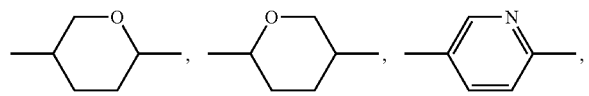

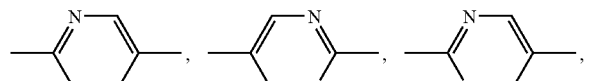

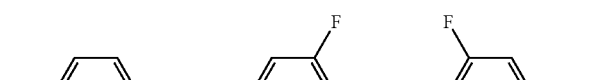

preferably

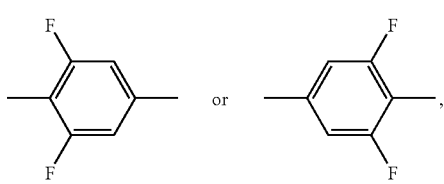

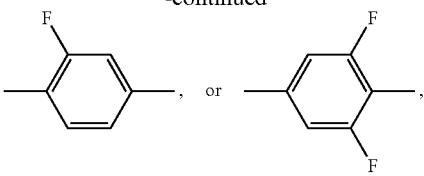

and

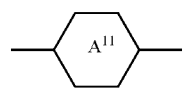

also denotes

$Z^{11}$ to $Z^{13}$, independently of one another and, if $Z^{11}$ and/or $Z^{13}$ are present more than once, also these independently of one another, denote —CH$_2$CH$_2$—, —CF$_2$CF$_2$—, —COO—, trans-CH=CH—, trans-CF=CF—, —CH$_2$O—, —CF$_2$O— or a single bond, preferably —CH$_2$CH$_2$—, —COO—, trans-CH=CH— or a single bond and very preferably a single bond, $L^{11}$ to $L^{14}$, independently of one another, denote H or F, preferably two or more of $L^{11}$ to $L^{14}$ denote F, preferably $L^{11}$ and/or $L^{13}$ denote F and very preferably all of them denote F, and j and k, independently of one another, denote 0, 1 or 2, but where (j+k) denotes 0, 1 or 2, preferably 0 or 1, and optionally a second dielectrically positive component, component B, comprising one or more dielectrically positive compounds, preferably having a dielectric anisotropy of greater than 3, preferably selected from the group of the compounds of the formulae II and III:

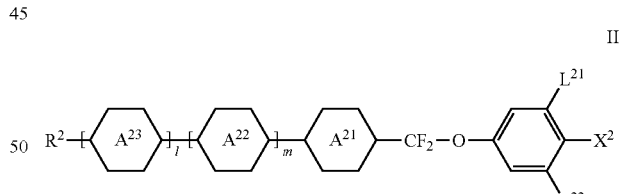

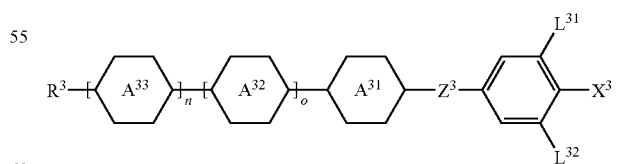

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and $R^2$ and $R^3$ preferably denote alkyl or alkenyl.

independently of one another, denote

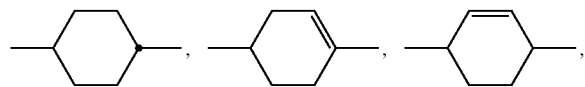

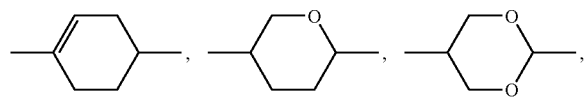

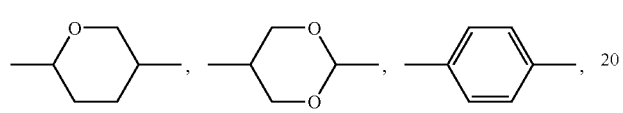

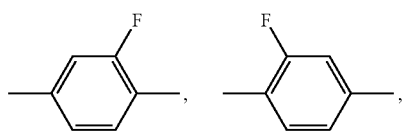

or

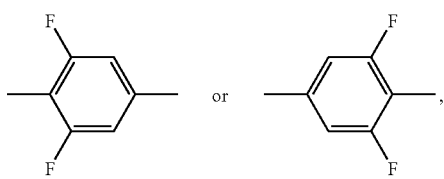

preferably

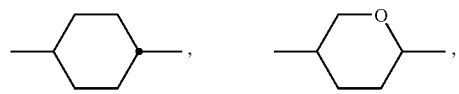

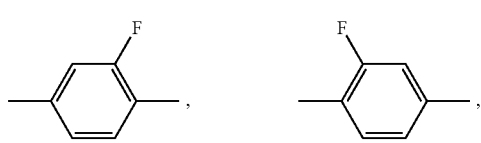

or 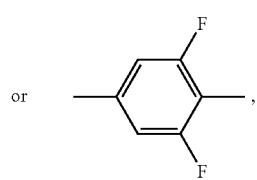

$L^{21}$, $L^{22}$, $L^{31}$ and $L^{32}$, independently of one another, denote H or F, $L^{21}$ and/or $L^{31}$ preferably denote F, $X^2$ and $X^3$, independently of one another, denote halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^3$ denotes —CH$_2$CH$_2$—, —CF$_2$CF$_2$—, —COO—, trans-CH═CH—, trans-CF═CF—, —CH$_2$O— or a single bond, preferably —CH$_2$CH$_2$—, —COO—, trans-CH═CH— or a single bond and very preferably —COO—, trans-CH═CH— or a single bond, and l, m, n and o, independently of one another, denote 0 or 1, and optionally a dielectrically neutral component, component C, comprising one or more dielectrically neutral compounds of the formula IV

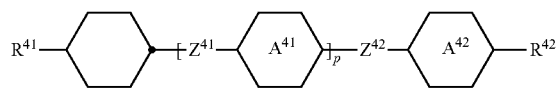

IV in which $R^{41}$ and $R^{42}$, independently of one another, have the meaning indicated above for $R^2$ under formula II, preferably $R^{41}$ denotes alkyl and $R^{42}$ denotes alkyl or alkoxy or $R^{41}$ denotes alkenyl and $R^{42}$ denotes alkyl,

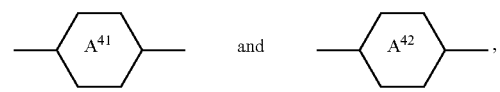

independently of one another and, in the case where

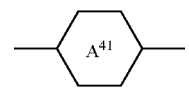

is present twice, also these independently of one another, denote

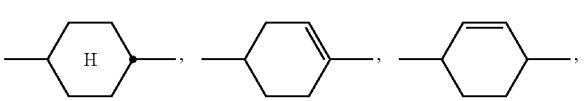

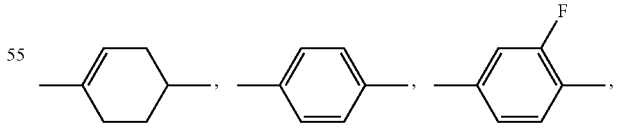

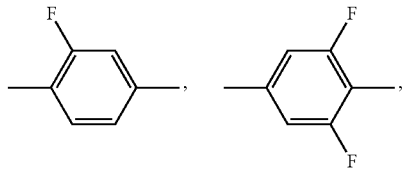

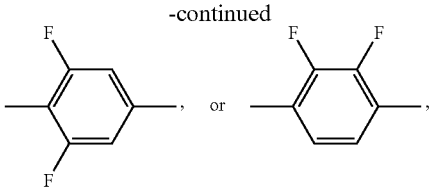

preferably one or more of

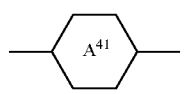 and 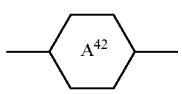

denote(s)

$Z^{41}$ and $Z^{42}$, independently of one another and, in the case where $Z^{41}$ is present twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more of them denote(s) a single bond, and p denotes 0, 1 or 2, preferably 0 or 1.

Component A preferably comprises, more preferably predominantly consists of, even more preferably essentially consists of and very preferably entirely consists of one or more dielectrically positive compounds of the formula I having a dielectric anisotropy of greater than 3 in which the parameters have the respective meanings indicated above under formula I and $X^1$ preferably denotes F.

In a preferred embodiment of the present invention, component A comprises, more preferably predominantly consists of, even more preferably essentially consists of and very preferably entirely consists of one or more dielectrically positive compounds having a dielectric anisotropy of greater than 3, of the formulae I', I" and I'":

in which the parameters have the meanings indicated above under formula I.

In a first particularly preferred embodiment of the present invention, component A comprises, more preferably predominantly consists of, even more preferably essentially consists of and very preferably entirely consists of one or more dielectrically positive compounds of the formula I' having a dielectric anisotropy of greater than 3.

In a further particularly preferred embodiment of the present invention, component A comprises, more preferably predominantly consists of, even more preferably essentially consists of and very preferably entirely consists of one or more dielectrically positive compounds of the formula I" having a dielectric anisotropy of greater than 3.

In still a further particularly preferred embodiment of the present invention, component A comprises, more preferably predominantly consists of, even more preferably essentially consists of and very preferably entirely consists of one or more dielectrically positive compounds of the formula I' having a dielectric anisotropy of greater than 3 and one or more dielectrically positive compounds of the formula I" having a dielectric anisotropy of greater than 3.

In a very particularly preferred embodiment of the present invention, component A comprises, more preferably predominantly consists of, even more preferably essentially consists of and very preferably entirely consists of one or more dielectrically positive compounds having a dielectric anisotropy of greater than 3, selected from th4 group of the compounds of the formulae I'A, I'B and I'C, preferably of the formula (e) I'A:

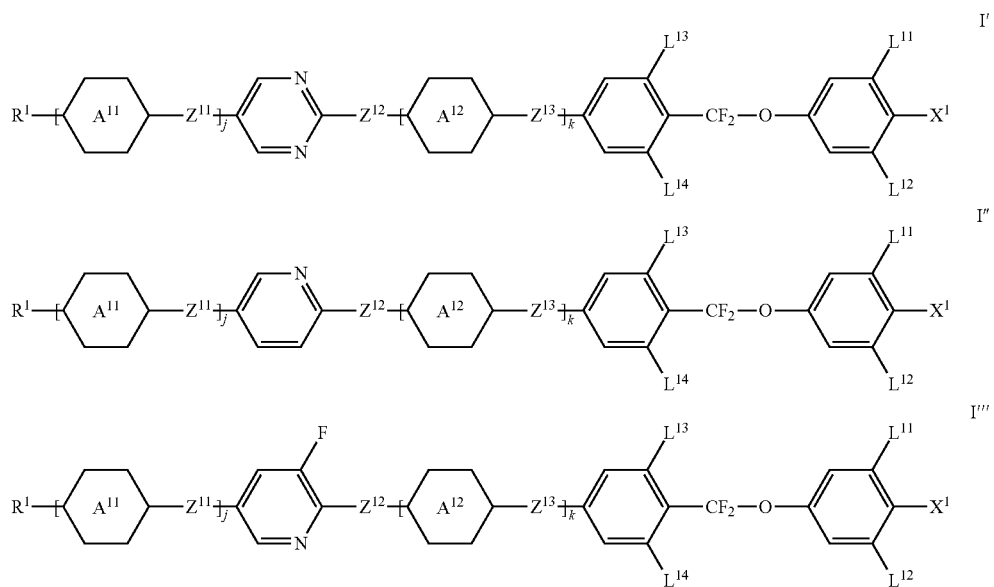

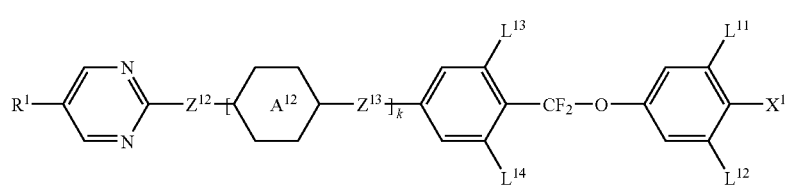

I'A

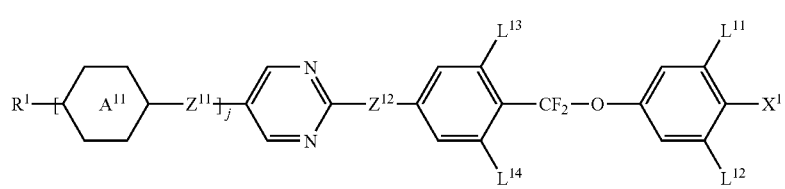

I'B

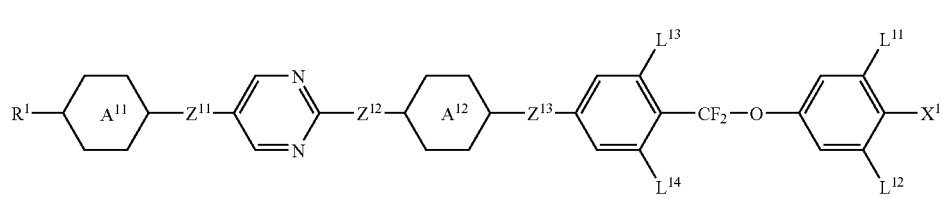

I'C in which the parameters have the meanings indicated above under formula I, but in formula I'B j does not denote 0.

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae I'A-1 and I'A-2:

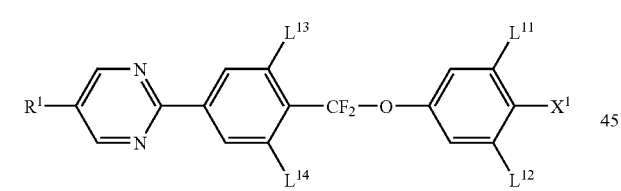

I'A-1

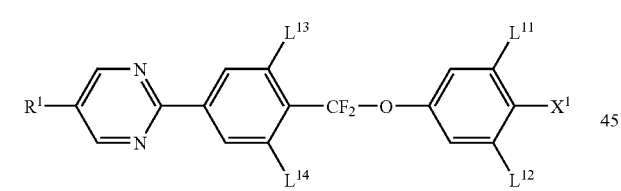

I'A-2 in which the parameters have the respective meanings indicated above under formula I, and in formula I'A-2 the parameters $L^{15}$ and $L^{16}$, independently of one another and of the other parameters, denote H or F, and $L^{15}$ preferably denotes F.

In a preferred embodiment of the present invention, component A comprises one or more compounds of the formula I'A-1. The compounds of the formula I'A-1 are preferably selected from the group of the compounds of the formulae I'A-1a to I'A-1d:

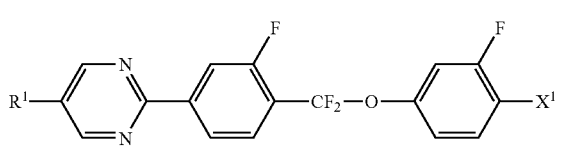

I'A-1a

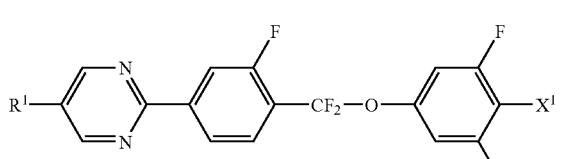

I'A-1b

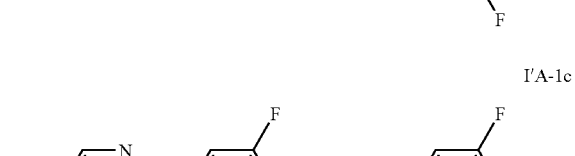

I'A-1c

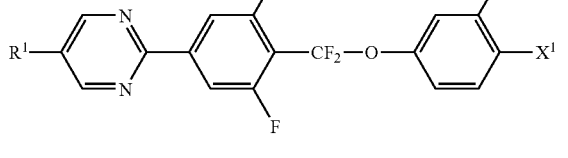

I'A-1d in which $R^1$ and $X^1$ have the respective meanings indicated above under formula I'A-1, and $X^1$ preferably denotes F, $CF_3$ or $OCF_3$ and particularly preferably F.

In a preferred embodiment of the present invention, component A comprises one or more compounds of the formula I'A-2. The compounds of the formula I'A-2 are preferably selected from the group of the compounds of the formulae I'A-2a to I'A-2n, preferably selected from the group of the compounds of the formulae I'A-2e to I'A-2l and very preferably of the formula I'A-2l:

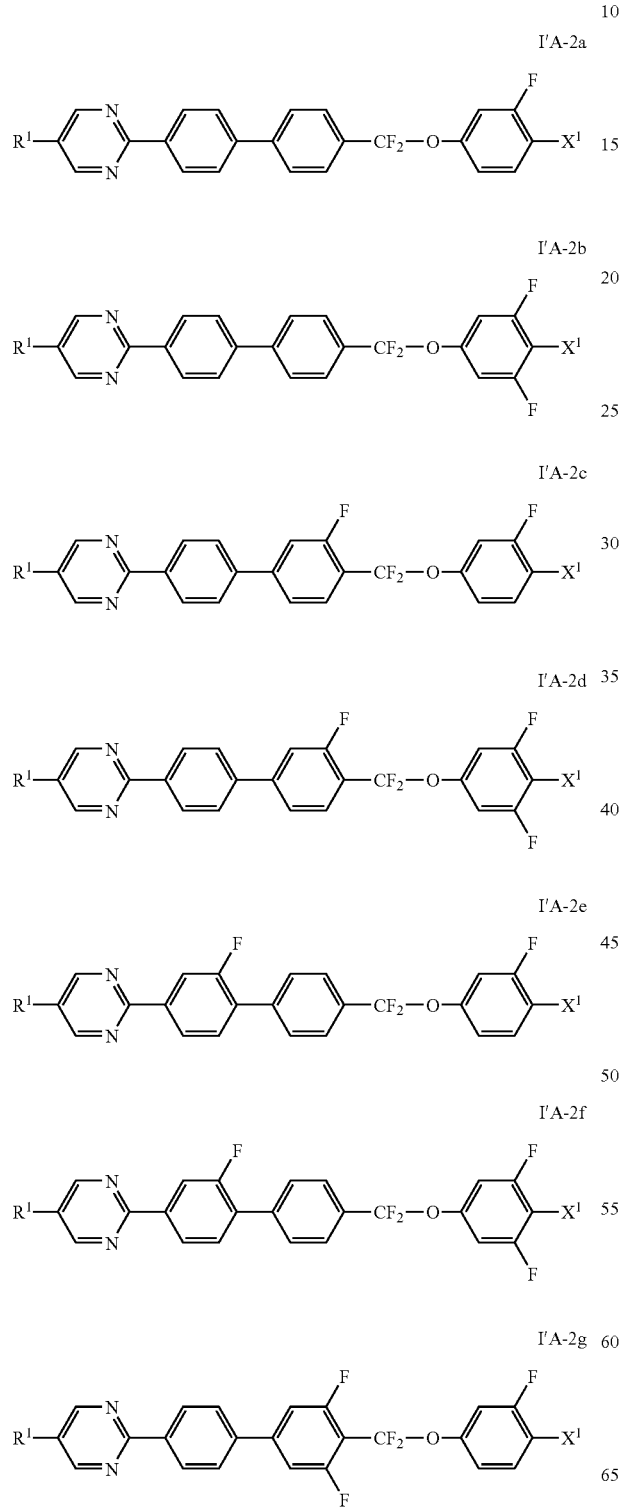

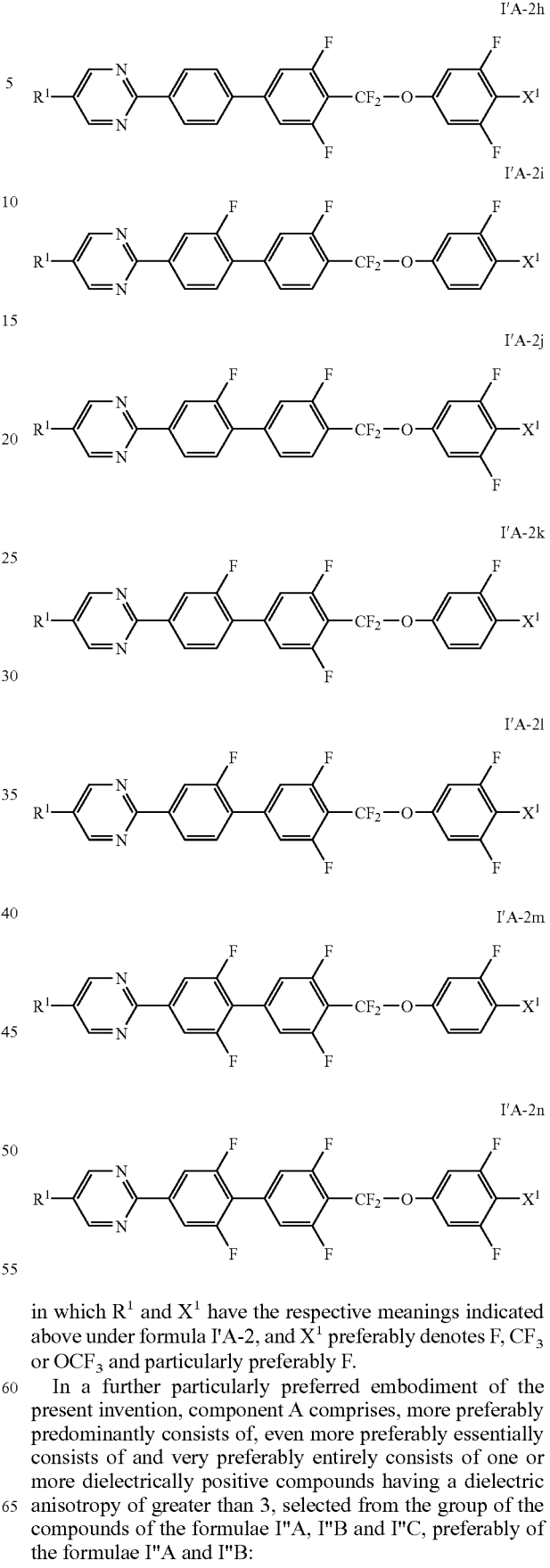

in which $R^1$ and $X^1$ have the respective meanings indicated above under formula I'A-2, and $X^1$ preferably denotes F, $CF_3$ or $OCF_3$ and particularly preferably F.

In a further particularly preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae I"A, I"B and I"C, preferably of the formulae I"A and I"B:

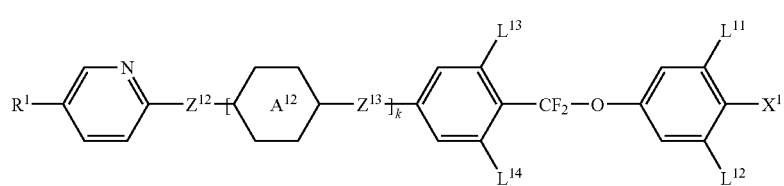

I"A

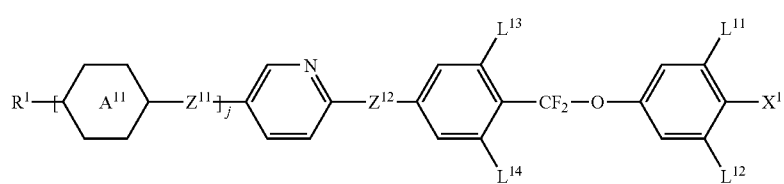

I"B

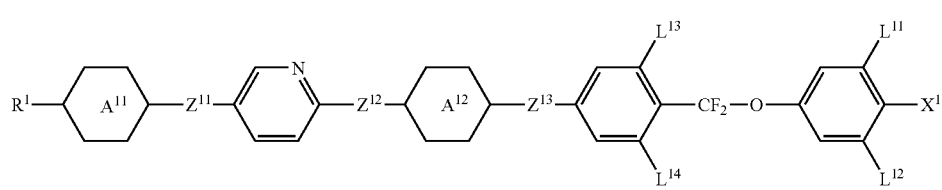

I"C in which the parameters have the meanings indicated above under formula I, but in formula I"B j does not denote 0.

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae I"A-1 and I"A-2:

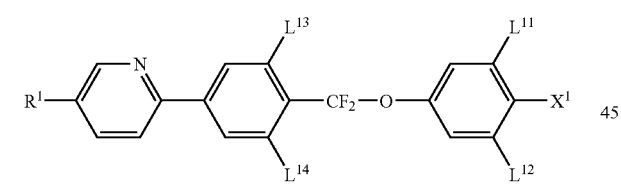

I"A-1

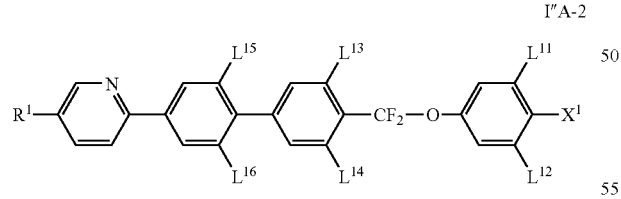

I"A-2 in which the parameters have the respective meanings indicated above under formula I, and in formula I"A-2 the parameters $L^{15}$ and $L^{16}$, independently of one another and of the other parameters, denote H or F, and $L^{15}$ preferably denotes F.

In a preferred embodiment of the present invention, component A comprises one or more compounds of the formula I"A-1. The compounds of the formula I"A-1 are preferably selected from the group of the compounds of the formulae I"A-1a to I"A-1d, particularly preferably of the formula I"A-1d:

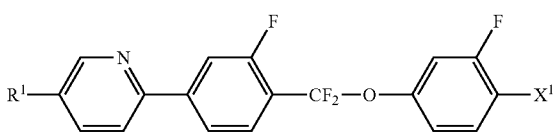

I"A-1a

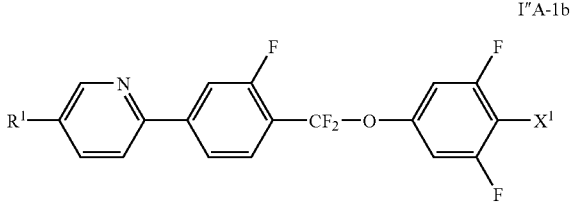

I"A-1b

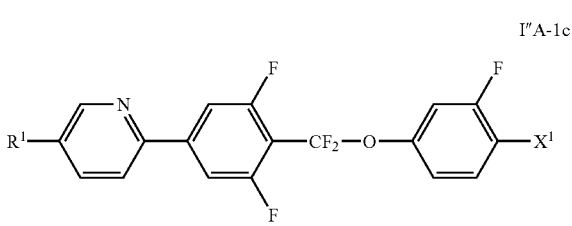

I"A-1c

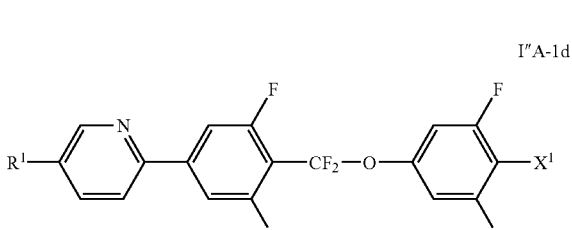

I"A-1d in which $R^1$ and $X^1$ have the respective meanings indicated above under formula I"A-1, and $X^1$ preferably denotes F, $CF_3$ or $OCF_3$ and particularly preferably F.

In a preferred embodiment of the present invention, component A comprises one or more compounds of the formula I″A-2. The compounds of the formula I″A-2 are preferably selected from the group of the compounds of the formulae I″A-2a to I″A-2n, preferably selected from the group of the compounds of the formulae I″A-2e to I″A-2l and very preferably of the formula I″A-2l:

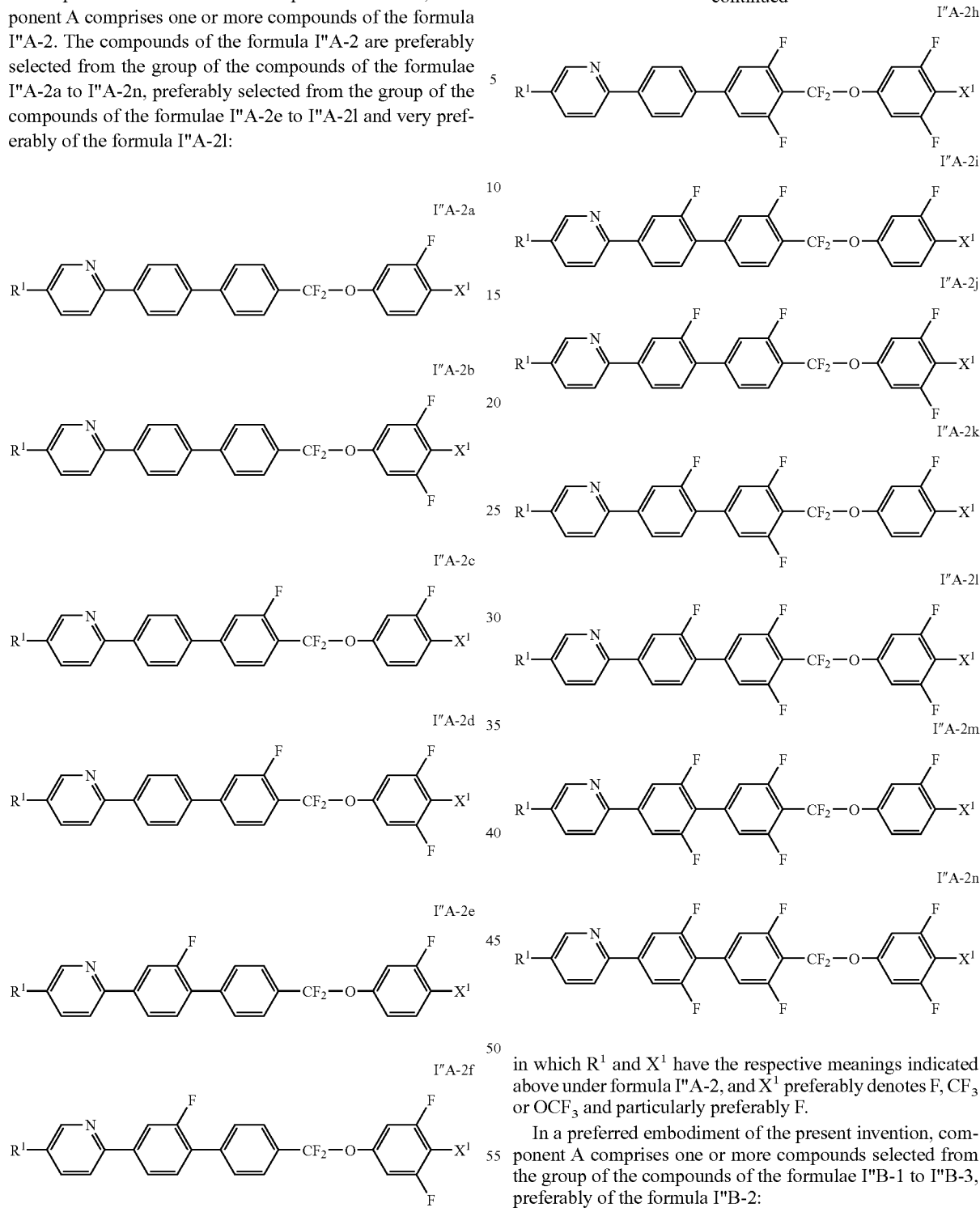

in which $R^1$ and $X^1$ have the respective meanings indicated above under formula I″A-2, and $X^1$ preferably denotes F, $CF_3$ or $OCF_3$ and particularly preferably F.

In a preferred embodiment of the present invention, component A comprises one or more compounds selected from the group of the compounds of the formulae I″B-1 to I″B-3, preferably of the formula I″B-2:

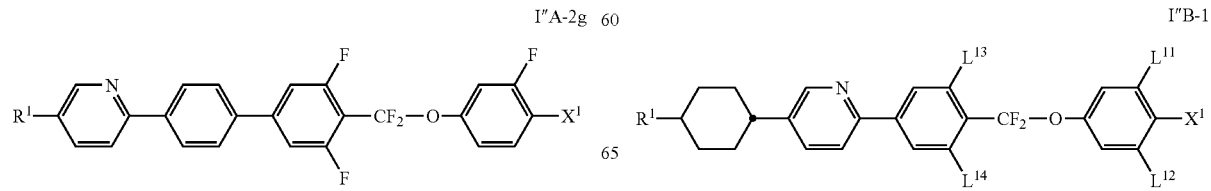

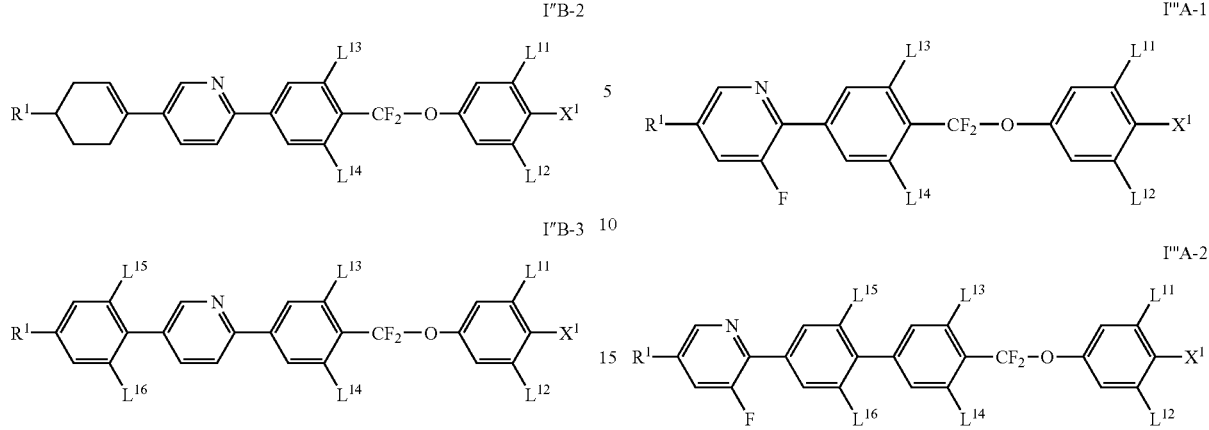

in which $R^1$ and $X^1$ have the respective meanings indicated above under formula I″B, and in formula I″B-3 the parameters $L^{15}$ and $L^{16}$, independently of one another and of the other parameters, denote H or F, and $L^{15}$ preferably denotes F, and $X^1$ preferably denotes F, $CF_3$ or $OCF_3$ and particularly preferably F.

In a further particularly preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae I‴A, I‴B and I‴C, preferably of the formulae I‴A and I‴B:

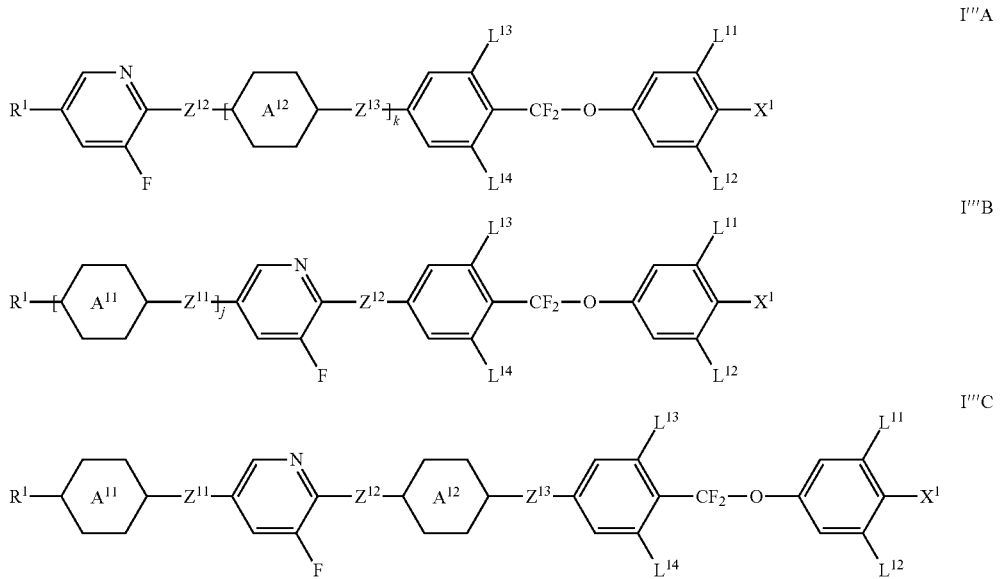

in which the parameters have the meanings indicated above under formula I, but in formula I‴B j does not denote 0.

In a preferred embodiment of the present invention, component A comprises, more preferably predominantly consists of, even more preferably essentially consists of and very preferably entirely consists of one or more dielectrically positive compounds having a dielectric anisotropy of greater than 3, selected from the group of the compounds of the formulae I‴A-1 and I‴A-2:

in which the parameters have the respective meanings indicated above under formula I, and in formula I‴A-2 the parameters $L^{15}$ and $L^{16}$, independently of one another and of the other parameters, denote H or F, and $L^{15}$ preferably denotes F.

In a preferred embodiment of the present invention, component A comprises one or more compounds of the formula I‴A-1. The compounds of the formula I‴A-1 are preferably selected from the group of the compounds of the formulae I‴A-1a to I‴A-1d, particularly preferably of the formula I‴A-1d:

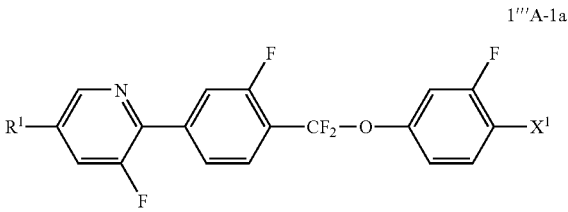

-continued

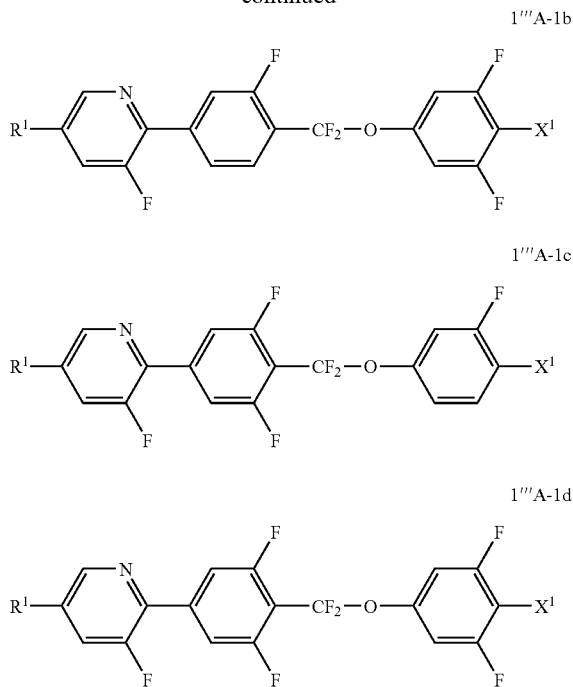

1'''A-1b

1'''A-1c

1'''A-1d in which $R^1$ and $X^1$ have the respective meanings indicated above under formula I''A-1, and $X^1$ preferably denotes F, $CF_3$ or $OCF_3$ and particularly preferably F.

In a preferred embodiment of the present invention, component A comprises one or more compounds selected from the group of the compounds of the formulae I'''B-1 to I'''B-3, preferably of the formula I'''B-3:

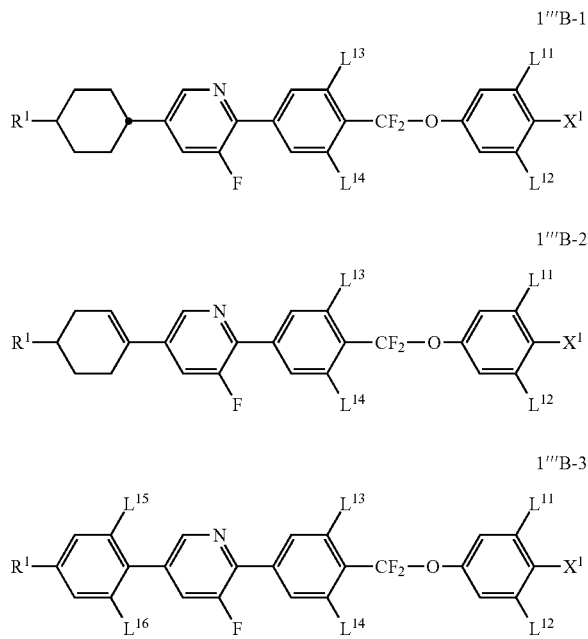

1'''B-1

1'''B-2

1'''B-3 in which $R^1$ and $X^1$ have the respective meanings indicated above under formula I'''B, and in formula I'''B-3 the parameters $L^{15}$ and $L^{16}$, independently of one another and of the other parameters, denote H or F, and $L^{15}$ preferably denotes F, and $X^1$ preferably denotes F, $CF_3$ or $OCF_3$ and particularly preferably F.

The concentration of component A in the medium is preferably in the range from 1% to 50%, more preferably from 2% to 40%, even more preferably from 4% to 35% and very preferably from 5% to 30%.

The media according to the present invention preferably comprise a second dielectrically positive component, component B. This second dielectric component, component B, preferably comprises, more preferably predominantly consists of, even more preferably essentially consists of and very preferably entirely consists of dielectrically positive compounds having a dielectric anisotropy of greater than 3.

This component, component B, preferably comprises, more preferably predominantly consists of, even more preferably essentially consists of and very preferably entirely consists of one or more dielectrically positive compounds having a dielectric anisotropy of greater than 3, selected from the group of the formulae II and III.

In a preferred embodiment of the present invention, component B comprises, more preferably predominantly consists of, even more preferably essentially consists of and very preferably entirely consists of one or more dielectrically positive compounds having a dielectric anisotropy of greater than 3, selected from the group of the compounds of the formulae I'-1 to II-3:

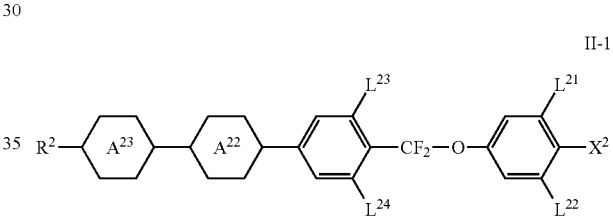

II-1

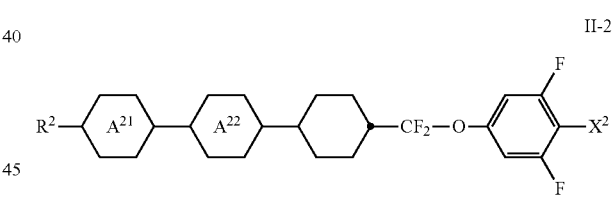

II-2

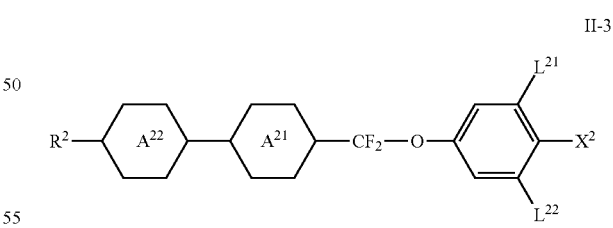

II-3 in which the parameters have the respective meanings indicated above under formula II, and in formula II-1 the parameters $L^{23}$ and $L^{24}$, independently of one another and of the other parameters, denote H or F, and in formula II-2

and independently of one another, preferably denote

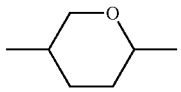 or 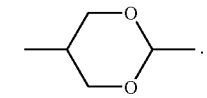.

Component B preferably comprises compounds which are selected from the group of the compounds of the formulae II-1 to II-3 in which $L^{21}$ and $L^{22}$ or $L^{23}$ and $L^{24}$ both denote F.

In a preferred embodiment, component B comprises compounds which are selected from the group of the compounds of the formulae I'-1 and II-2 in which $L^{21}$, $L^{22}$, $L^{23}$ and $L^{24}$ all denote F.

Component B preferably comprises one or more compounds of the formula II-1. The compounds of the formula II-1 are preferably selected from the group of the compounds of the formulae II-1a to II-1j:

II-1a
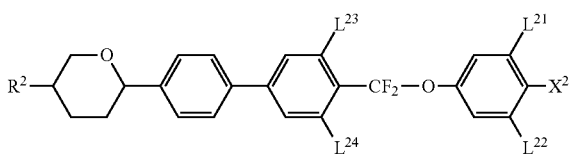

II-1b

II-1c
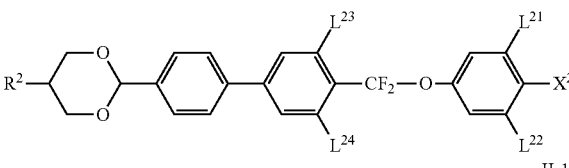

II-1d
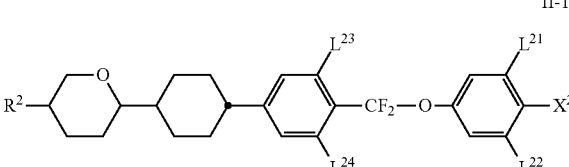

II-1e
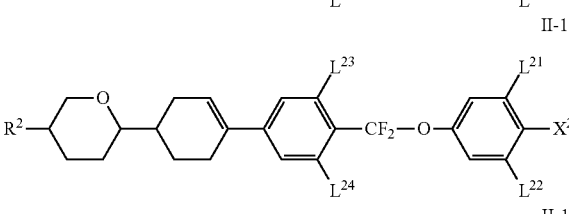

II-1f
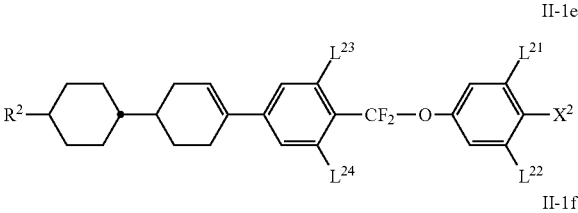

II-1g
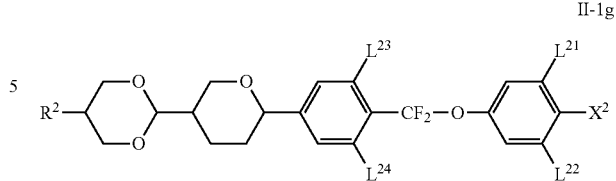

II-1h
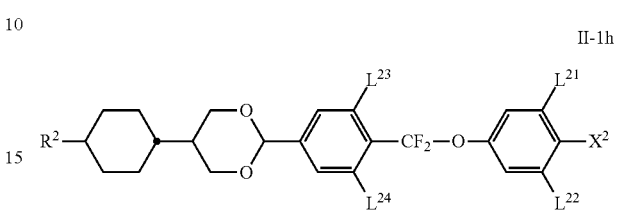

II-1i
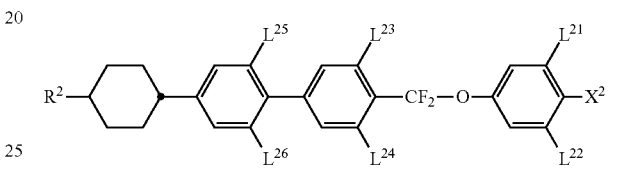

II-1j
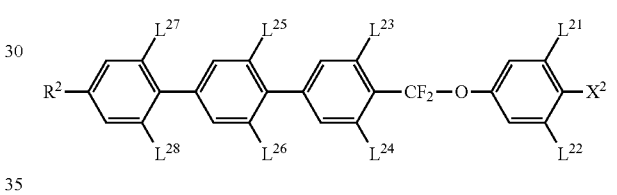

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H.

Component B preferably comprises compounds which are selected from the group of the compounds of the formulae II-1a to II-1e in which $L^{21}$ and $L^{22}$ both denote F and/or $L^{23}$ and $L^{24}$ both denote F.

In a preferred embodiment, component B comprises compounds which are selected from the group of the compounds of the formulae II-1a to II-1h in which $L^{21}$, $L^{22}$, $L^{23}$ and $L^{24}$ all denote F.

Especially preferred compounds of the formula II-1 are

II-1a-1
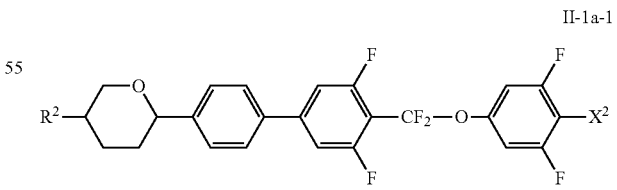

II-1c-1
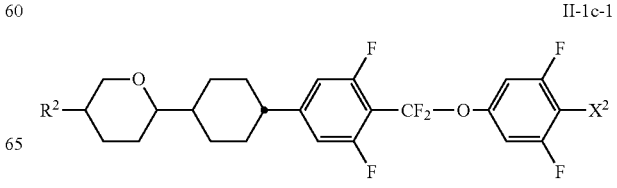

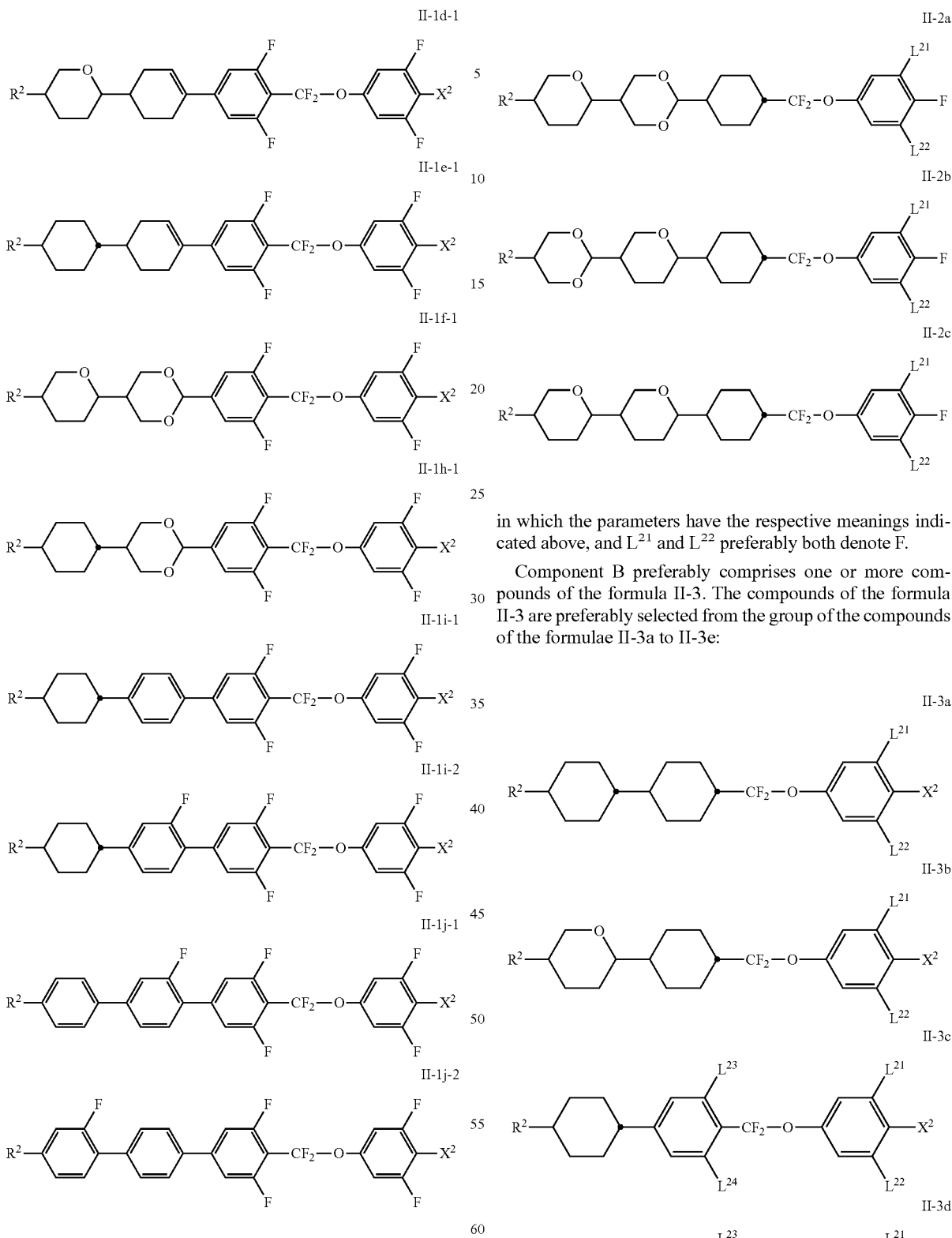

in which the parameters have the respective meanings indicated above, and $L^{21}$ and $L^{22}$ preferably both denote F.

Component B preferably comprises one or more compounds of the formula II-3. The compounds of the formula II-3 are preferably selected from the group of the compounds of the formulae II-3a to II-3e:

in which $R^2$ and $X^2$ have the meanings indicated above, and $X^2$ preferably denotes F.

Component B preferably comprises one or more compounds of the formula II-2. The compounds of the formula II-2 are preferably selected from the group of the compounds of the formulae II-2a to II-2c:

-continued

II-3e

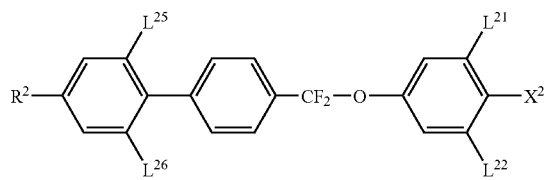

in which the parameters have the respective meanings indicated above, and $L^{25}$ and $L^{26}$, independently of one another and of the other parameters, denote H or F, and preferably
in formulae II-3a and II-3b
$L^{21}$ and $L^{22}$ both denote F,
in formulae II-3c and II-3d
$L^{21}$ and $L^{22}$ both denote F and/or $L^{23}$ and $L^{24}$ both denote F, and
in formula II-3e
$L^{21}$, $L^{22}$ and a $L^{23}$ denote F.

Especially preferred compounds of the formula II-3 are

II-3a-1

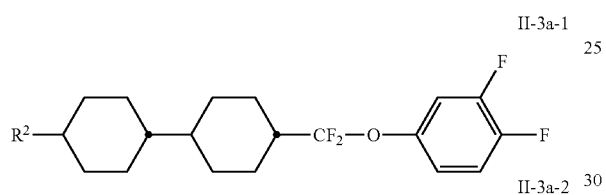

II-3a-2

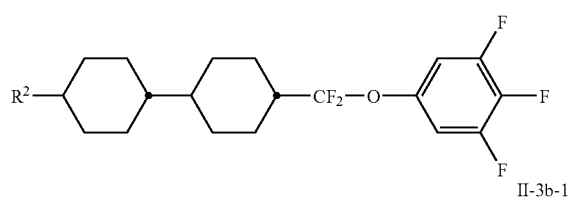

II-3b-1

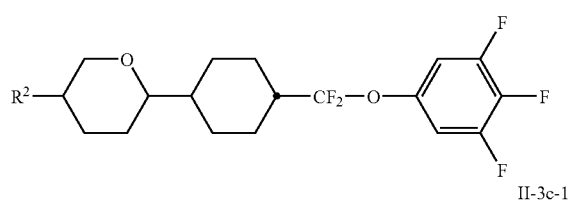

II-3c-1

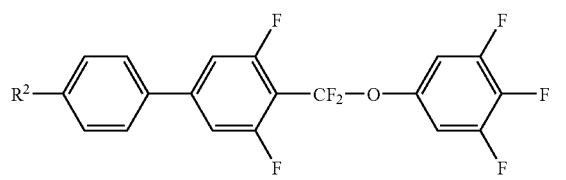

II-3e-2

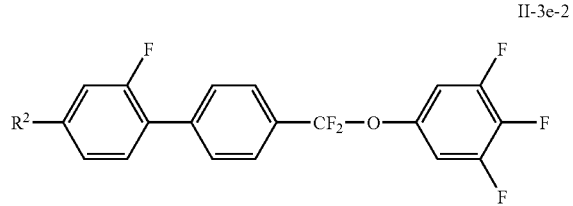

in which $R^2$ has the meaning indicated above.

In a further preferred embodiment of the present invention, component B comprises, more preferably predominantly consists of, even more preferably essentially consists of and very preferably entirely consists of one or more dielectrically positive compounds having a dielectric anisotropy of greater than 3, selected from the group of the formulae III-1 and III-2:

III-1

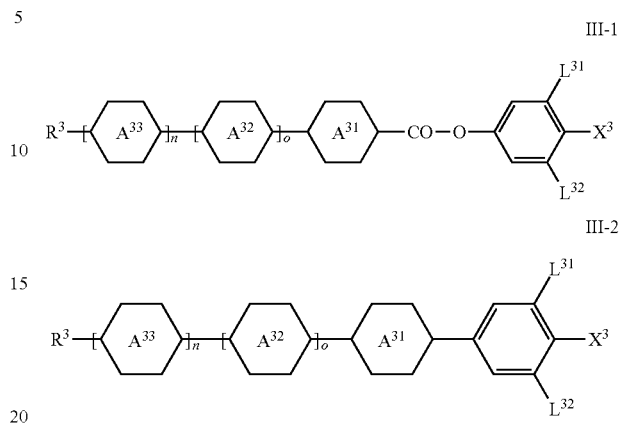

III-2 in which the parameters have the respective meanings indicated above under formula III.

Component B preferably comprises one or more compounds of the formula III-1. The compounds of the formula III-1 are preferably selected from the group of the compounds of the formulae III-1a and III-1b:

III-1a

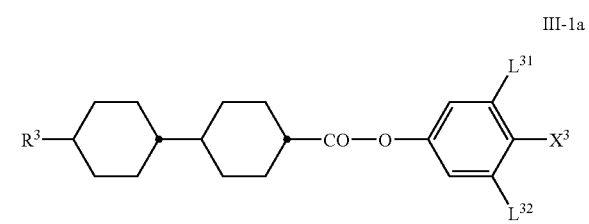

III-1b

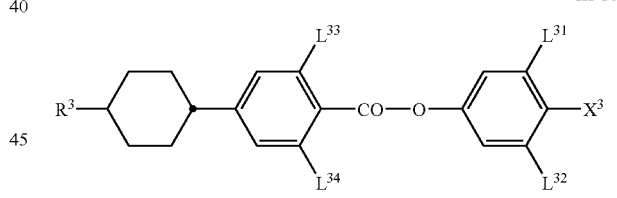

in which the parameters have the respective meanings indicated above, and the parameters $L^{33}$ and $L^{34}$, independently of one another and of the other parameters, denote H or F.

Component B preferably comprises one or more compounds of the formula III-2. The compounds of the formula III-2 are preferably selected from the group of the compounds of the formulae III-2a to III-2h:

III-2a

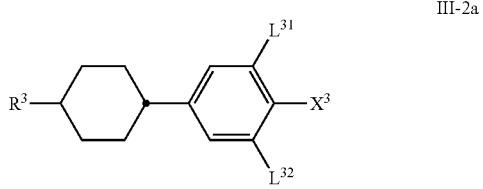

Component B preferably comprises one or more compounds of the formula III-1a, which are preferably selected from the group of the compounds of the formulae III-1a-1 to III-1a-6:

in which $R^3$ has the meaning indicated above.

Component B preferably comprises one or more compounds of the formula III-1b, which are preferably selected from the group of the compounds of the formulae III-1b-1 to III-1b-4, preferably III-1b4:

in which the parameters have the respective meanings indicated above, and the parameters $L^{35}$ and $L^{36}$, independently of one another and of the other parameters, denote H or F.

-continued

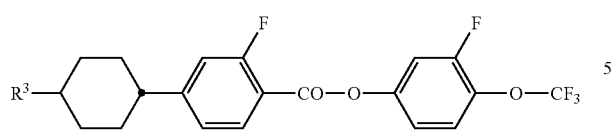
III-1b-4 in which R³ has the meaning indicated above.

Component B preferably comprises one or more compounds of the formula III-2a, which are preferably selected from the group of the compounds of the formulae III-2a-1 to III-2a-4:

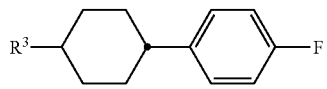
III-2a-1

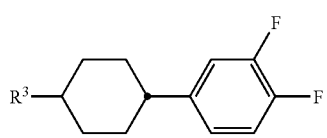
III-2a-2

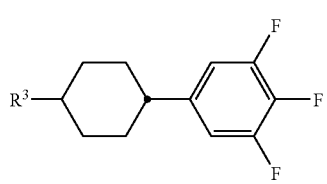
III-2a-3

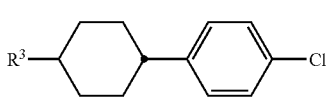
III-2a-4 in which R³ has the meaning indicated above.

Component B preferably comprises one or more compounds of the formula III-2b, which are preferably selected from the group of the compounds of the formulae III-2b-1 and III-2b-2, preferably III-2b-2:

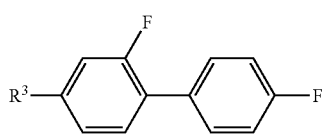
III-2b-1

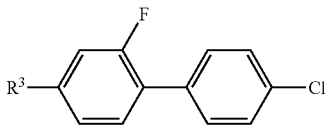
III-2b-2 in which R³ has the meaning indicated above.

Component B preferably comprises one or more compounds of the formula III-2c, which are preferably selected from the group of the compounds of the formulae III-2c-1 to III-2c-5:

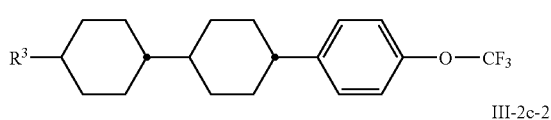
III-2c-1

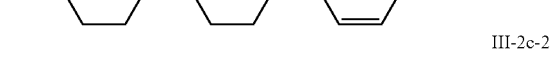
III-2c-2

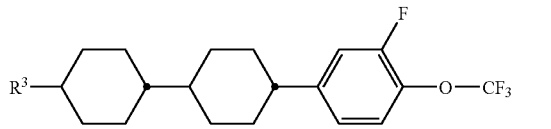
III-2c-3

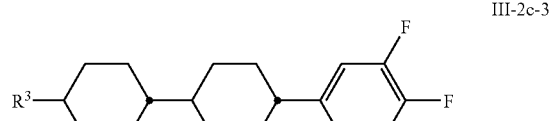
III-2c-4

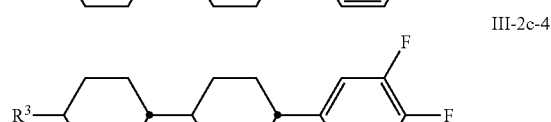
III-2c-5 in which R³ has the meaning indicated above.

Component B preferably comprises one or more compounds selected from the group of the compounds of the formulae III-2d and III-2e, which are preferably selected from the group of the compounds of the formulae III-2d-1 and III-2e-1:

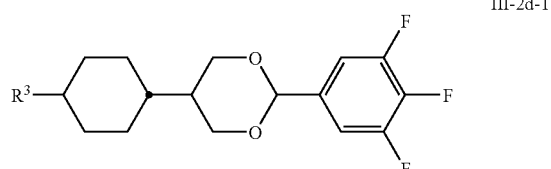
III-2d-1

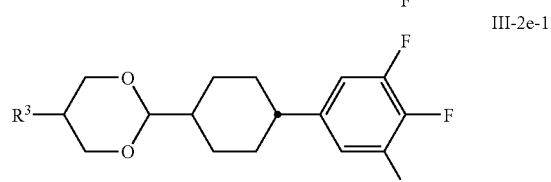
III-2e-1 in which R³ has the meaning indicated above.

Component B preferably comprises one or more compounds of the formula III-2f, which are preferably selected from the group of the compounds of the formulae III-2f-1 to III-2f-5:

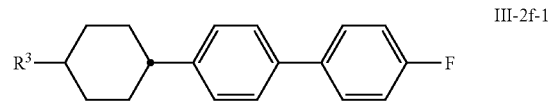
III-2f-1

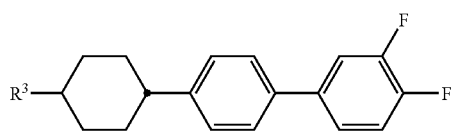
III-2f-2

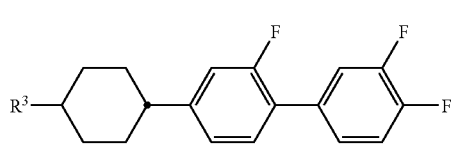
III-2f-3

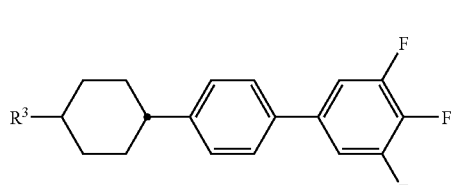
III-2f-4

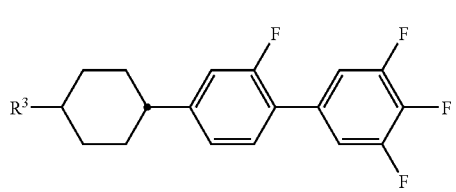
III-2f-5 in which R³ has the meaning indicated above.

Component B preferably comprises one or more compounds of the formula III-2g, which are preferably selected from the group of the compounds of the formulae III-2g-1 to III-2g-5:

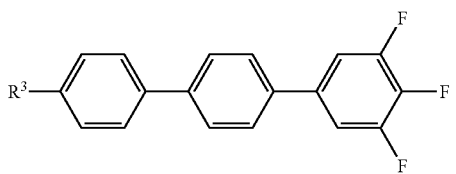
III-2g-1

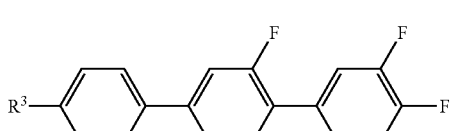
III-2g-2

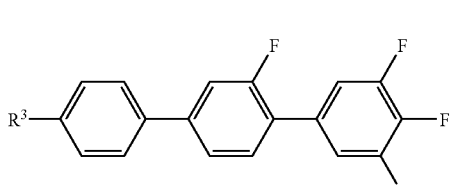
III-2g-3

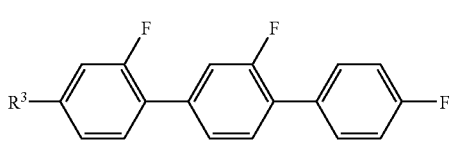
III-2g-4

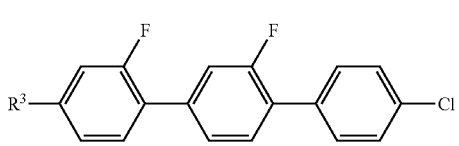
III-2g-5 in which R³ has the meaning indicated above.

Component B preferably comprises one or more compounds of the formula III-2h, which are preferably selected from the group of the compounds of the formulae III-2h-1 to III-2h-5:

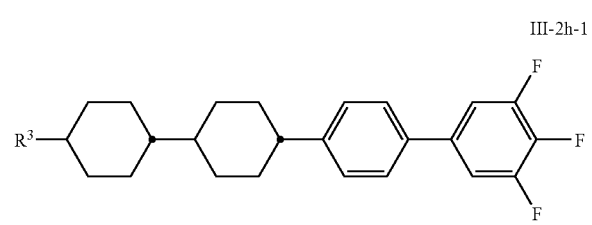
III-2h-1

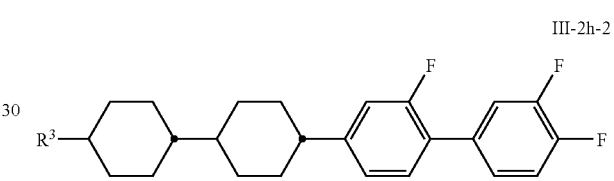
III-2h-2

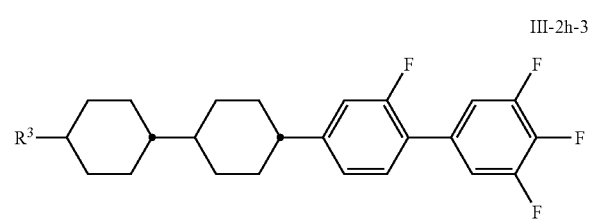
III-2h-3

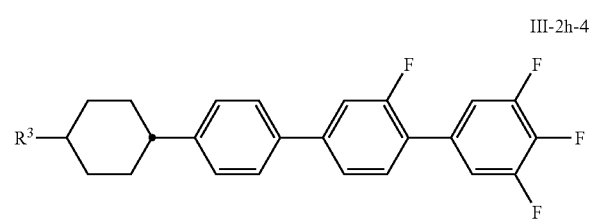
III-2h-4

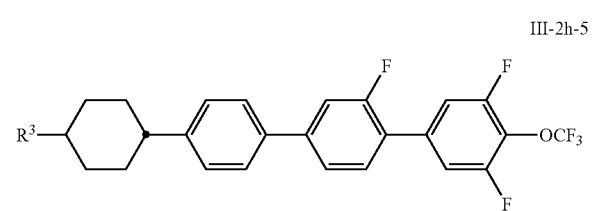
III-2h-5 in which R³ has the meaning indicated above.

Alternatively or in addition to compounds of the formulae III-1 and/or III-2, the media according to the present invention may comprise one or more compounds of the formula III-3

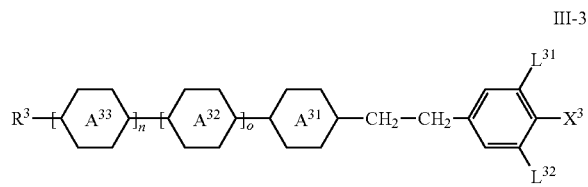

in which the parameters have the respective meanings indicated above under formula III and are preferably selected from the group of the formulae III-3a and III-3b:

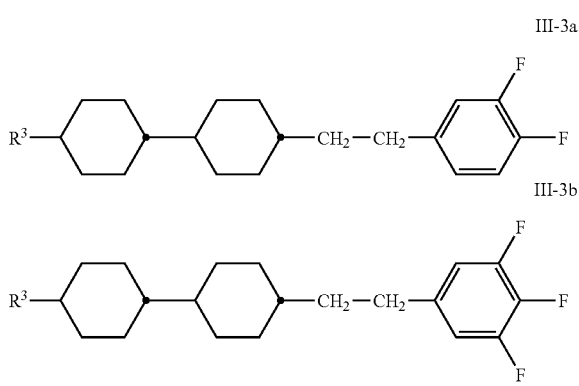

in which $R^3$ has the meaning indicated above.

The liquid-crystalline media according to the present invention preferably comprise a dielectrically neutral component, component C. This component has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises one or more, more preferably predominantly consists of, even more preferably essentially consists of and very preferably entirely consists of dielectrically neutral compounds having a dielectric anisotropy in the range from −1.5 to 3, of the formula IV.

The dielectrically neutral component, component C, preferably comprises one or more compounds selected from the group of the compounds of the formulae IV-1 to IV-6:

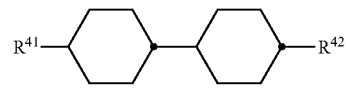

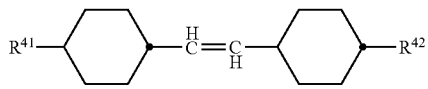

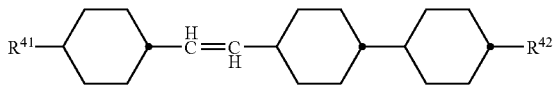

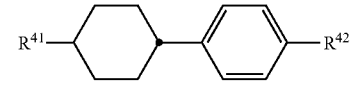

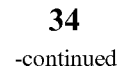

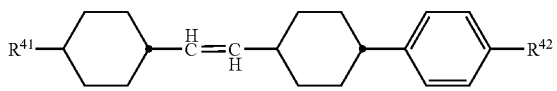

in which $R^{41}$ and $R^{42}$ have the respective meanings indicated above under formula IV, and in formulae IV-1, IV-5 and IV-6 $R^{41}$ preferably denotes alkyl or alkenyl, preferably alkenyl, and $R^{42}$ preferably denotes alkyl or alkenyl, preferably alkyl, in formula IV-2 $R^{41}$ and $R^{42}$ preferably denote alkyl, and in formula IV-4 $R^{41}$ preferably denotes alkyl or alkenyl, more preferably alkyl, and $R^{42}$ preferably denotes alkyl or alkoxy, more preferably alkoxy.

The dielectrically neutral component, component C, preferably comprises one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably one or more compounds of each of the formulae IV-1, IV-4 and IV-5 and very preferably one or more compounds of each of the formulae IV-1, IV-4, IV-5 and IV-6.

In a preferred embodiment, component C preferably comprises one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, component C preferably comprises one or more compounds of the formula IV-1, more preferably selected from the respective sub-formulae thereof of the formulae CC-n-m, CC-n-V and/or CC-n-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1 and CC-3-V2. The definitions of these abbreviations (acronyms) are likewise indicated below in Table D or are evident from Tables A to C.

In a further preferred embodiment of the present invention, which may be the same as the previous one or a different one, the liquid-crystal mixtures according to the present invention comprise component C which comprises, preferably predominantly consists of and very preferably entirely consists of compounds of the formula IV selected from the group of the compounds of the formulae IV-1 to IV-6 as shown above and optionally of the formulae IV-7 to IV-14:

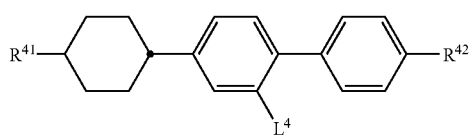

IV-8

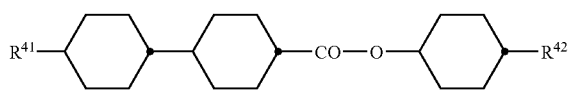

IV-9

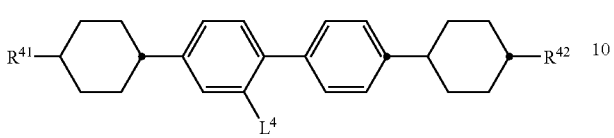

IV-10

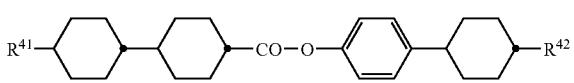

IV-11

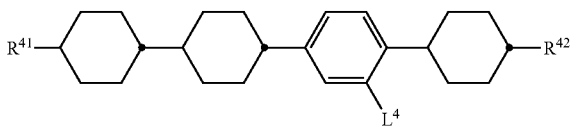

IV-12

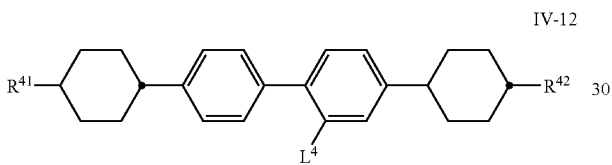

IV-13

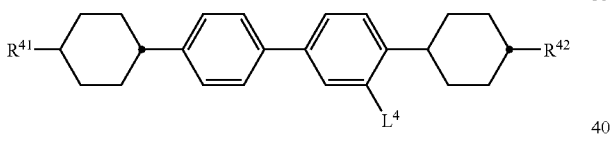

IV-14

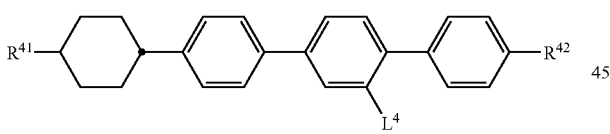

in which
$R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and
$L^4$ denotes H or F.

In a preferred embodiment, component C preferably comprises one or more compounds of the formula IV-7, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

Alternatively or in addition to the compounds of the formulae II and/or III, the media according to the present invention may comprise in component B one or more dielectrically positive compounds of the formula V

V

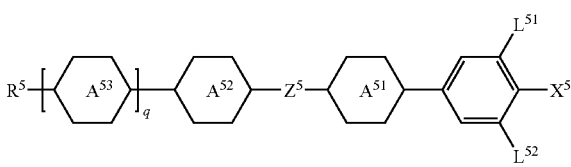

in which
$R^5$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably denotes alkyl or alkenyl,

independently of one another, denote

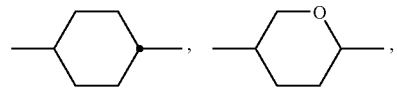

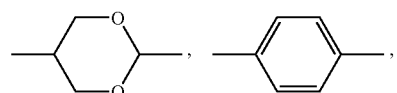

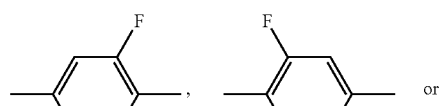

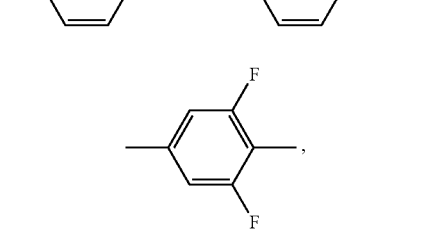

$L^{51}$ and $L^{52}$, independently of one another, denote H or F, $L^{51}$ preferably denotes F, and $X^5$ denotes halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^5$ denotes —CH$_2$CH$_2$—, —CF$_2$CF$_2$—, —COO—, trans-CH═CH—, trans-CF═CF— or —CH$_2$O—, preferably —CH$_2$CH$_2$—, —COO— or trans-CH═CH— and very preferably —COO— or trans-CH═CH—, and q denotes 0 or 1.

The media according to the present invention preferably comprise one or more compounds of the formula V, preferably selected from the group of the compounds of the formulae V-1 and V-2:

V-1

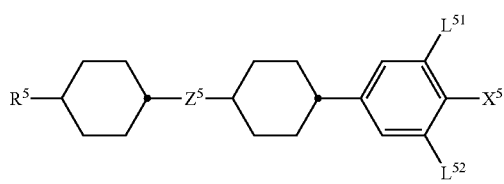

V-2

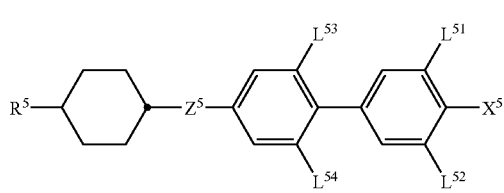

in which the parameters have the respective meanings indicated above, and the parameters $L^{53}$ and $L^{54}$, independently of one another and of the other parameters, denote H or F, and $Z^5$ preferably denotes —CH$_2$—CH$_2$—.

The compounds of the formula V-1 are preferably selected from the group of the compounds of the formulae V-1a and V-1b:

V-1a

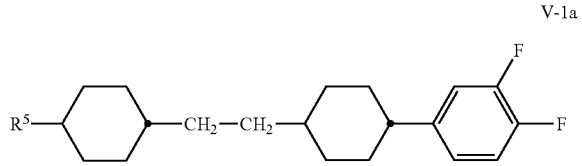

V-1b

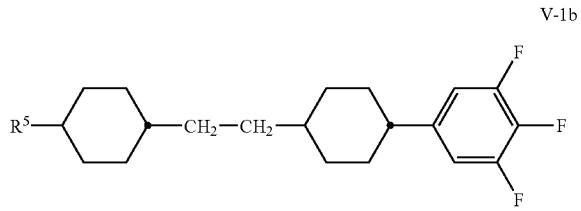

in which $R^5$ has the meaning indicated above.

The compounds of the formula V-2 are preferably selected from the group of the compounds of the formulae V-2a to V-2d:

V-2a

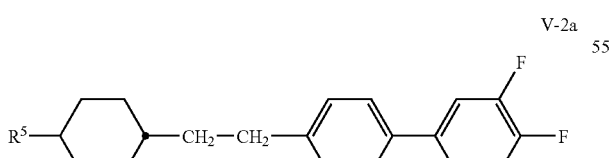

V-2b

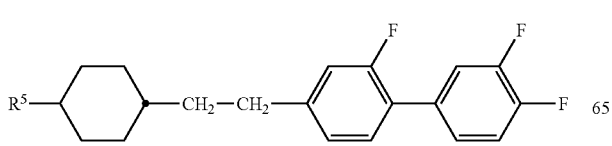

V-2c
V-2d

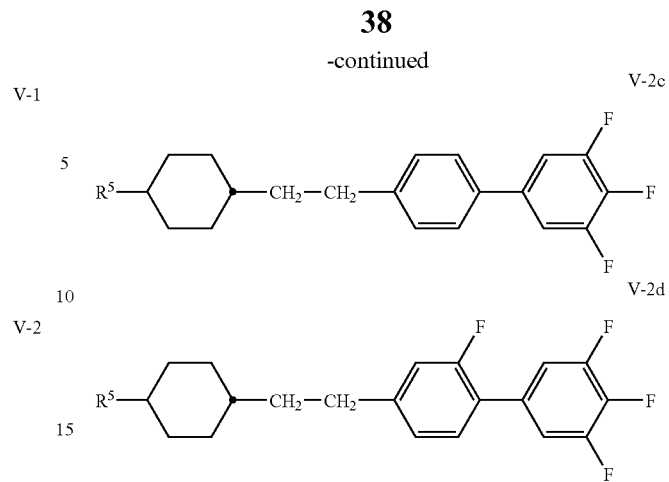

in which $R^5$ has the meaning indicated above.

The liquid-crystalline media according to the present invention preferably comprise an additional dielectrically neutral component, component D. This component has a dielectric anisotropy in the range from −1.5 to 3. It preferably comprises, more preferably predominantly consists of, even more preferably essentially consists of and especially preferably entirely consists of dielectrically neutral compounds having a dielectric anisotropy in the range from −1.5 to 3. This component preferably comprises, more preferably predominantly consists of, even more preferably essentially consists of and very preferably entirely consists of one or more dielectrically neutral compounds having a dielectric anisotropy in the range from −1.5 to 3, of the formula VI

VI

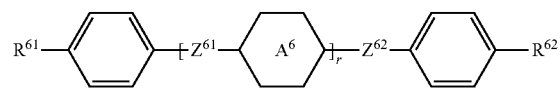

in which
$R^{61}$ and $R^{62}$, independently of one another, have the meaning indicated above for $R^2$ under formula II, preferably $R^{61}$ denotes alkyl and $R^{62}$ denotes alkyl or alkenyl,

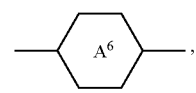

and if it occurs twice, independently of one another on each occurrence, denotes

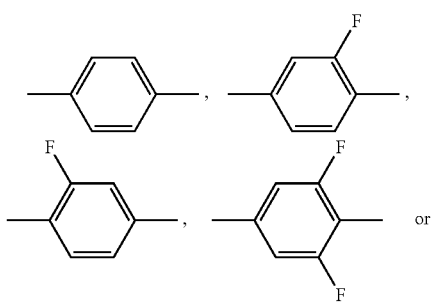

or

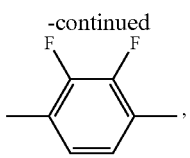

preferably one or more of

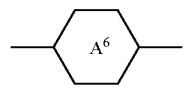

denote

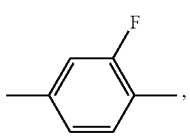

$Z^{61}$ and $Z^{62}$, independently of one another and, if $Z^{61}$ is present twice, also these independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond, and
r denotes 0, 1 or 2, preferably 0 or 1.

The dielectrically neutral component, component D, preferably comprises one or more compounds selected from the group of the compounds of the formulae VI-1 and VI-2:

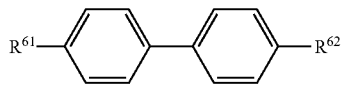

VI-1

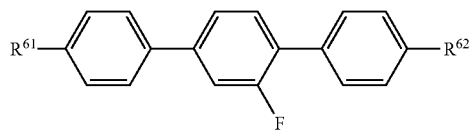

VI-2 in which $R^{61}$ and $R^{62}$ have the respective meanings indicated above under formula VI, and $R^{61}$ preferably denotes alkyl, and in formula VI-1 $R^{62}$ preferably denotes alkenyl, preferably —(CH$_2$)$_2$—CH=CH—CH$_3$, and in formula VI-2 $R^{62}$ preferably denotes alkyl.

The dielectrically neutral component, component D, preferably comprises one or more compounds selected from the group of the compounds of the formulae VI-1 and VI-2, in which $R^{61}$ preferably denotes n-alkyl, and in formula VI-1 $R^{62}$ preferably denotes alkenyl, and in formula VI-2 $R^{62}$ preferably denotes n-alkyl.

In a preferred embodiment, component D preferably comprises one or more compounds of the formula VI-1, more preferably of the sub-formula PP-n-2Vm thereof, even more preferably of the formula PP-1-2V1. The definitions of these abbreviations (acronyms) are indicated below in Table D or are evident from Tables A to C.

In a preferred embodiment, component D preferably comprises one or more compounds of the formula VI-2, more preferably of the sub-formula PGP-n-m thereof, even more preferably of the sub-formula PGP-3-m thereof, very preferably selected from the formulae PGP-3-2, PGP-3-3, PGP-3-4 and PGP-3-5. The definitions of these abbreviations (acronyms) are likewise indicated below in Table D or are evident from Tables A to C.

The liquid-crystal mixtures according to the present invention preferably comprise at least one further component besides components A and B. This third component may be one of components C and D; the third component present is preferably component C.

The mixtures according to the present invention may of course also comprise all four components A, B, C and D.

In addition, the liquid-crystal mixtures according to the present invention may comprise a further optional component, component E, which has negative dielectric anisotropy and comprises, preferably predominantly consists of, more preferably essentially consists of and very preferably entirely consists of dielectrically negative compounds, preferably of the formula VII

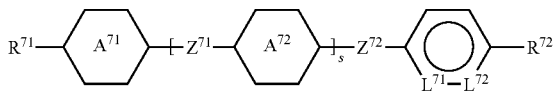

VII in which
$R^{71}$ and $R^{72}$, independently of one another, have the meaning indicated above for $R^2$ under formula II,

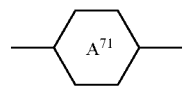

denotes

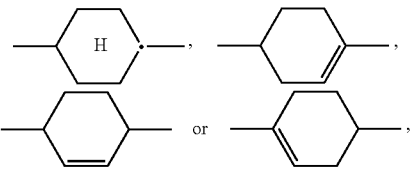

preferably

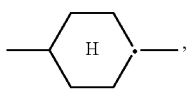

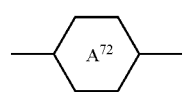

denotes

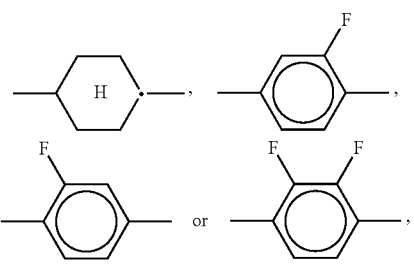

$Z^{71}$ and $Z^{72}$, independently of one another, denote —CH$_2$CH$_2$—, —COO—, trans-CH=CH—, trans- CF=CF—, —CH$_2$O—, —CF$_2$O— or a single bond, preferably one or more of them denote(s) a single bond and very preferably both denote a single bond, L$^{71}$ and L$^{72}$, independently of one another, denote C—F or N, preferably one or more of them denote(s) C—F and very preferably both denote C—F, and s denotes 0 or 1.

In addition, the liquid-crystal mixtures according to the present invention may comprise a further optional component, component F, which has positive dielectric anisotropy and comprises, preferably predominantly consists of, more preferably essentially consists of and very preferably entirely consists of dielectrically positive compounds, preferably of the formula VIII

VIII in which

R$^8$ has the meaning indicated above for R$^2$ under formula II, one of

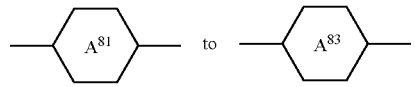

which is present denotes

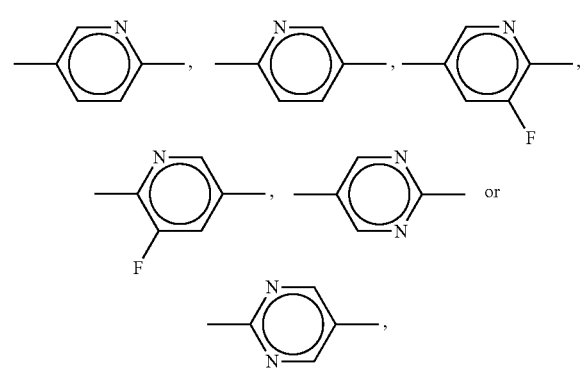

preferably

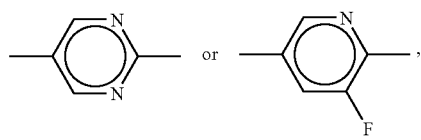

preferably

denotes

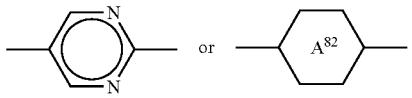

denotes

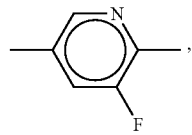

and the others have the same meaning or, independently of one another, denote

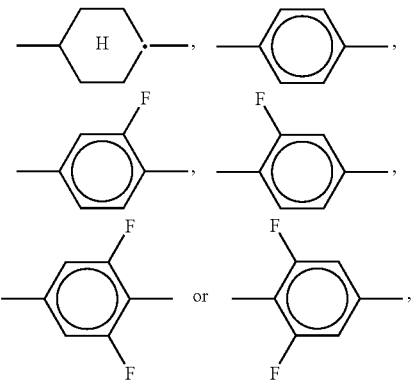

preferably

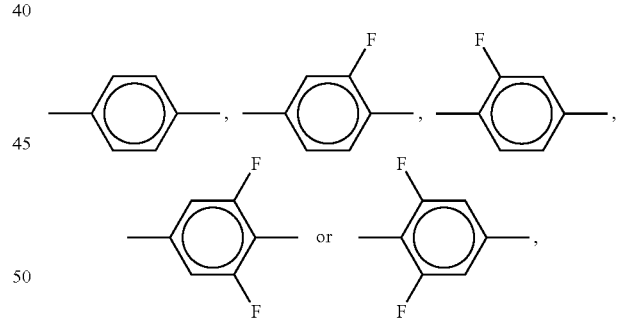

Z$^{81}$ and Z$^{82}$, independently of one another, denote —CH$_2$CH$_2$—, —COO—, trans-CH=CH—, trans-CF=CF—, —CH$_2$O—, —CF$_2$O— or a single bond, preferably one or more of them denote(s) a single bond and very preferably both denote a single bond, t denotes 0, 1 or 2, preferably 0 or 1, more preferably 1, and X$^8$ has the meaning indicated above for X$^2$ under formula II or alternatively, independently of R$^8$, may have the meaning indicated for R$^8$ and from which the compounds of the formula I are excluded.

The liquid-crystalline media according to the present invention preferably comprise, more preferably predominantly consist of, even more preferably essentially consist of and very preferably entirely consist of components A to E, preferably A to D and very preferably A to C, and in particular compounds selected from the group of the compounds of the formulae I to VIII, preferably I to V and very preferably I to III and/or IV.

In this application, comprising in connection with compositions means that the relevant entity, i.e. the medium or the component, comprises the component or components or the compound or compounds indicated, preferably in a total concentration of 10% or more and very preferably 20% or more.

In this connection, predominantly consisting of means that the relevant entity comprises 55% or more, preferably 60% or more and very preferably 70% or more of the component or components or the compound or compounds indicated.

In this connection, essentially consisting of means that the relevant entity comprises 80% or more, preferably 90% or more and very preferably 95% or more of the component or components or the compound or compounds indicated.

In this connection, entirely consisting of means that the relevant entity comprises 98% or more, preferably 99% or more and very preferably 100.0% of the component or components or the compound or compounds indicated.

Component E preferably comprises, more preferably predominantly consists of and very preferably entirely consists of one or more compounds of the formula VII, preferably selected from the group of the compounds of the formulae VII-1 to VII-3:

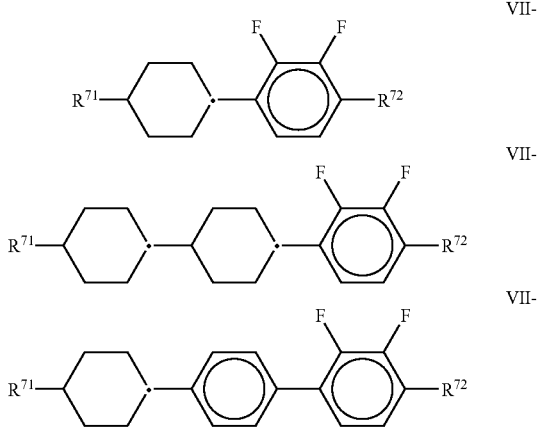

in which
R$^{71}$ and R$^{72}$ have the respective meanings indicated above under formula VII.

In formulae VII-1 to VII-3, R$^{71}$ preferably denotes n-alkyl or 1 E-alkenyl and R$^{72}$ preferably denotes n-alkyl or alkoxy.

Other mesogenic compounds which are not explicitly mentioned above can optionally and advantageously also be used in the media according to the present invention. Such compounds are known to the person skilled in the art.

The liquid-crystal media according to the present invention preferably have a clearing point of 60° C. or more, particularly preferably 70° C. or more and very particularly preferably 75° C. or more.

The Δn of the liquid-crystal media according to the present invention, at 589 nm (Na$^D$) and 20° C., is preferably in the range from 0.060 or more to 0.140 or less, more preferably in the range from 0.070 or more to 0.130 or less, even more preferably in the range from 0.080 or more to 0.125 or less and very preferably in the range from 0.090 or more to 0.122 or less.

In a preferred embodiment of the present application, the Δn of the liquid-crystal media according to the present invention is preferably 0.080 or more, more preferably 0.090 or more.

The Δ∈ of the liquid-crystal medium according to the invention, at 1 kHz and 20° C., is preferably 2 or more, more preferably 4 or more and very preferably 6 or more. In particular, Δ∈ is 15 or less.

The nematic phase of the media according to the invention preferably extends at least from 0° C. or less to 65° C. or more, more preferably at least from −20° C. or less to 70° C. or more, very preferably at least from −30° C. or less to 75° C. or more and in particular at least from −40° C. or less to 75° C. or more.

In a first preferred embodiment of the present invention, the Δn of the liquid-crystal media is in the range from 0.090 or more to 0.130 or less, more preferably in the range from 0.095 or more to 0.120 or less and very preferably in the range from 0.100 or more to 0.115 or less, while Δ∈ is preferably in the range from 2 or more to 12 or less, preferably 10 or less.

In a second preferred embodiment of the present invention, the Δn of the liquid-crystal media is in the range from 0.085 or more to 0.130 or less, more preferably in the range from 0.090 or more to 0.125 or less and very preferably in the range from 0.095 or more to 0.120 or less, while Δ∈ is preferably 4 or more, more preferably 6 or more, even more preferably 8.0 or more and very preferably in the range from 8.0 or more to 10.0 or less.

In this embodiment, the nematic phase of the media according to the invention preferably extends at least from −20° C. or less to 65° C. or more, more preferably at least from −20° C. or less to 70° C. or more, very preferably at least from −30° C. or less to 70° C. or more and in particular at least from −40° C. or less to 70° C. or more.

In a third preferred embodiment of the present invention, the Δn of the liquid-crystal media is in the range from 0.070 or more to 0.120 or less, more preferably in the range from 0.075 or more to 0.115 or less and very preferably in the range from 0.080 or more to 0.110 or less, while Δ∈ is preferably 2.0 or more, more preferably is in the range from 3.0 or more to 14.0 or less and very preferably is either in the range from 4.0 or more to 6.0 or less or particularly preferably in the range from 6.0 or more to 11.0 or less.

In this embodiment, the nematic phase of the media according to the invention preferably extends at least from −20° C. or less to 75° C. or more, more preferably at least from −30° C. or less to 70° C. or more, very preferably at least from −30° C. or less to 75° C. or more and in particular at least from −30° C. or less to 80° C. or more.

In a fourth preferred embodiment of the present invention, the Δn of the liquid-crystal media is in the range from 0.080 or more to 0.120 or less, more preferably in the range from 0.085 or more to 0.115 or less and very preferably in the range from 0.090 or more to 0.110 or less, while Δ∈ is preferably 1.5 or more, more preferably is in the range from 2.0 or more to 8.0 or less and very preferably is either in the range from 2.0 or more to 6.0 or less or particularly preferably in the range from 2.0 or more to 4.0 or less.

In this embodiment, the nematic phase of the media according to the invention preferably extends at least from −20° C. or less to 65° C. or more, more preferably at least from −30° C. or less to 70° C. or more, very preferably at least from −30° C. or less to 75° C. or more and in particular at least from −30° C. or less to 80° C. or more.

In a fifth preferred embodiment of the present invention, the Δn of the liquid-crystal media is in the range from 0.090 or more to 0.140 or less, while Δ∈ is in the range from 2.0 or more to 14.0 or less.

In accordance with the present invention, component A is preferably used in a concentration of 1% to 50%, more preferably of 1% to 30%, even more preferably of 2% to 30% and very preferably of 3% to 30% of the mixture as a whole.

Component B is preferably used in a concentration of 2% to 60%, more preferably of 3% to 55%, even more preferably of 15% to 50% and very preferably of 20% to 45% of the mixture as a whole.

Component C is preferably used in a concentration of 0% to 70%, more preferably of 10% to 65%, even more preferably of 20% to 60% and very preferably of 15% to 55% of the mixture as a whole.

Component D is preferably used in a concentration of 0% to 50%, more preferably of 1% to 40%, even more preferably of 5% to 30% and very preferably of 10% to 20% of the mixture as a whole.

Component E is preferably used in a concentration of 0% to 30%, more preferably of 0% to 15% and very preferably of 1% to 10% of the mixture as a whole.

The media according to the invention may optionally comprise further liquid-crystal compounds in order to adjust the physical properties. Such compounds are known to the person skilled in the art. Their concentration in the media according to the present invention is preferably 0% to 30%, more preferably 0.1% to 20% and very preferably 1% to 15%.

In the first preferred embodiment of the present invention mentioned above, component A is preferably used in a concentration of 1% to 65%, more preferably of 3% to 60% and very preferably of 5% to 57% of the mixture as a whole, while component D is preferably used in a concentration of 5% to 40%, more preferably of 10% to 35% and very preferably of 10% to 30% of the mixture as a whole.

In this preferred embodiment, the media preferably comprise one or more compounds of the formula VI and very preferably of the formula VI-2.

Especially in the second preferred embodiment of the present invention mentioned above, component C preferably comprises one or more compounds of the formula IV, more preferably of the formula IV-1, even more preferably selected from the respective sub-formulae thereof of the formulae CC-n-V and/or CC-n-Vm, more preferably of the formulae CC-n-V1 and/or CC-n-V and very preferably selected from the group of the formulae CC-3-V, CC-4-V, CC-5-V and CC-3-V1. The definitions of these abbreviations (acronyms) are indicated in Table D below.

The liquid-crystal media preferably comprise in total 50% to 100%, more preferably 70% to 100% and very preferably 80% to 100% and in particular 90% to 100% of components A, B, C and D, preferably of components A, B and C, which in turn comprise, preferably predominantly consist of and very preferably entirely consist of one or more of the compounds of the formulae I, II, III, IV, V, VI and VII, preferably of the formulae I, II, III, IV, V and VI.

In the present application, the expression dielectrically positive describes compounds or components where Δ∈>3.0, dielectrically neutral describes those where −1.5≦Δ∈≦3.0 and dielectrically negative describes those where Δ∈<−1.5. Δ∈ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The thickness of both types of cells is approximately 20 μm. The voltage applied is a rectangular wave having a frequency of 1 kHz and a root mean square value of typically 0.5 V to 1.0 V, but it is always selected to be below the capacitive threshold of the respective test mixture.

Δ∈ is defined as (∈∥−∈⊥), while $\in_{av.}$ is (∈∥+2∈⊥)/3.

The host mixture used for dielectrically positive compounds is mixture ZLI-4792 and that used for dielectrically neutral and dielectrically negative compounds is mixture ZLI-3086, both from Merck KGaA, Germany. The dielectric permittivities of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericksz threshold ($V_{Fr}$), is only used if expressly mentioned.

The ranges of the parameters indicated in this application all include the limit values, unless explicitly stated otherwise.

The different upper and lower limit values indicated for various ranges of properties in combination with one another give rise to additional preferred ranges.

Throughout this application, the following conditions and definitions apply unless expressly stated otherwise. All concentrations are indicated in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany and are quoted for a temperature of 20° C., unless expressly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties, are determined using test cells produced at Merck KGaA, Germany. The test cells for the determination of Δ∈ have a cell gap of approximately 20 μm. The electrode is a circular ITO electrode having an area of 1.13 cm$^2$ and a guard ring. The orientation layers are SE-1211 from Nissan Chemicals, Japan, for homeotropic orientation (∈∥) and polyimide AL-1054 from Japan Synthetic Rubber, Japan, for homogeneous orientation (∈⊥). The capacitances are determined using a Solatron 1260 frequency response analyser using a sine wave with a voltage of 0.3 $V_{rms}$. The light used in the electro-optical measurements is white light. A set-up using the commercially available DSM instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystal media according to the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the greater amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

By addition of suitable additives, the liquid-crystal media according to the present invention can be modified in such a way that they can be used in all known types of liquid-crystal displays, either using the liquid-crystal media as such, such as TN, TN-AMD, ECB-AMD, VAN-AMD, IPS-AMD, FFS-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celcius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using the Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while table B shows the linking groups. Table C lists the meanings of the codes of the left-hand or right-hand end groups. Table D shows illustrative structures of compounds together with their respective abbreviations.

TABLE A

| Ring elements | | | |
|---|---|---|---|
| C | (cyclohexane ring) | P | (benzene ring) |
| L | (cyclohexene ring) | LI | (cyclohexene ring) |
| F | (fluorocyclohexene) | FI | (fluorocyclohexene) |
| A | (tetrahydropyran) | AI | (tetrahydropyran) |
| D | (dioxane) | DI | (dioxane) |
| M | (pyrimidine) | MI | (pyrimidine) |
| N | (pyridine) | NI | (pyridine) |
| nf | (fluoropyridine) | nfI | (fluoropyridine) |
| G | (fluorobenzene) | GI | (fluorobenzene) |
| U | (difluorobenzene) | UI | (difluorobenzene) |
| np | (naphthalene) | dh | (decahydronaphthalene) |
| th | (tetrahydronaphthalene) | thI | (tetrahydronaphthalene) |
| Y | (difluorobenzene) | | |

TABLE B

| Linking groups | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | T | —C≡C— |

TABLE C

| End groups | | | |
|---|---|---|---|
| Left-hand side | | Right-hand side | |
| Use alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$CmH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -OXF- | $CF_2$=CH—O— | -OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Use together | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are spacers for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

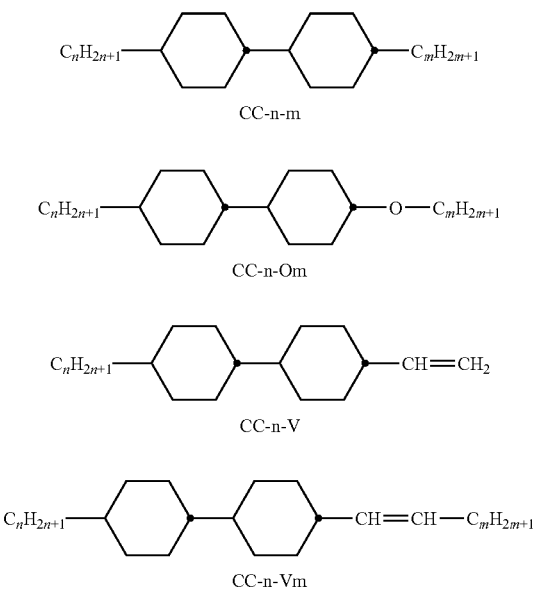

CC-n-m

CC-n-Om

CC-n-V

CC-n-Vm

TABLE D-continued

Illustrative structures $C_nH_{2n+1}$—⟨C⟩—⟨C⟩—$(CH_2)_m$—CH=$CH_2$
CC-n-mV $C_nH_{2n+1}$—⟨C⟩—⟨C⟩—$(CH_2)_m$—CH=CH—$C_lH_{2l+1}$
CC-n-mVl $H_2C$=CH—⟨C⟩—⟨C⟩—CH=$CH_2$
CC-V-V $CH_2$=CH—⟨C⟩—⟨C⟩—$(CH_2)_m$—CH=$CH_2$
CC-V-mV $CH_2$=CH—⟨C⟩—⟨C⟩—CH=CH—$C_mH_{2m+1}$
CC-V-Vm $CH_2$=CH—$(CH_2)_n$—⟨C⟩—⟨C⟩—$(CH_2)_m$—CH=$CH_2$
CC-Vn-mV $C_nH_{2n+1}$—CH=CH—⟨C⟩—⟨C⟩—$(CH_2)_m$—CH=$CH_2$
CC-nV-mV $C_nH_{2n+1}$—CH=CH—⟨C⟩—⟨C⟩—CH=CH—$C_mH_{2m+1}$
CC-nV-Vm $C_nH_{2n+1}$—⟨C⟩—⟨P⟩—$C_mH_{2m+1}$
CP-n-m $C_nH_{2n+1}$O—⟨C⟩—⟨P⟩—$C_mH_{2m+1}$
CP-nO-m $C_nH_{2n+1}$—⟨C⟩—⟨P⟩—$OC_mH_{2m+1}$
CP-n-Om $C_nH_{2n+1}$—⟨P⟩—⟨P⟩—$C_mH_{2m+1}$
PP-n-m TABLE D-continued
Illustrative structures
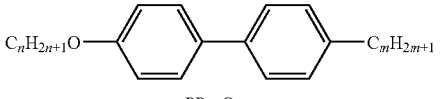
PP-nO-m
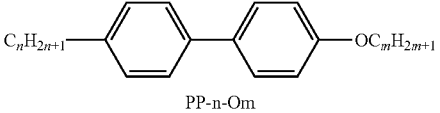
PP-n-Om
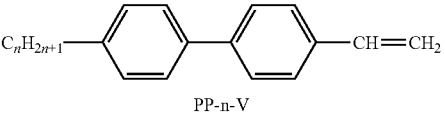
PP-n-V
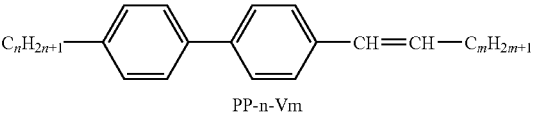
PP-n-Vm
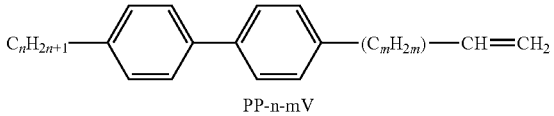
PP-n-mV
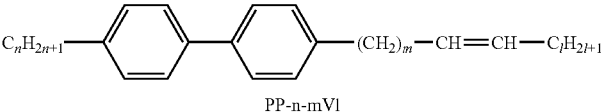
PP-n-mVl
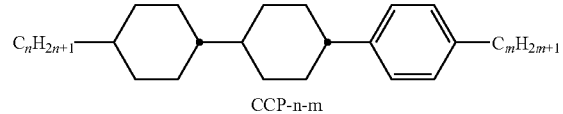
CCP-n-m
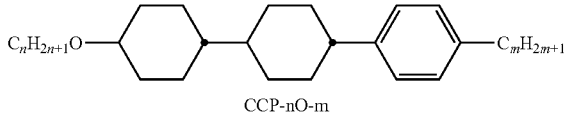
CCP-nO-m
CCP-n-Om
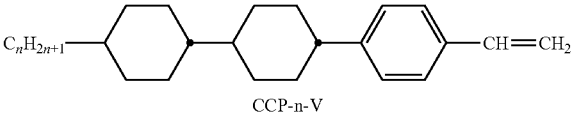
CCP-n-V
CCP-n-Vm
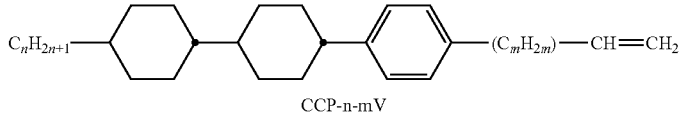
CCP-n-mV TABLE D-continued Illustrative structures CCP-n-mVl CCP-V-m CCP-nV-m CCP-Vn-m CCP-nVm-l CPP-n-m CPG-n-m CGP-n-m CPP-nO-m CPP-n-Om CPP-V-m TABLE D-continued Illustrative structures $C_nH_{2n+1}$—CH=CH—[Cy]—[Ph]—[Ph]—$C_mH_{2m+1}$
CPP-nV-m $CH_2$=CH—$(C_nH_{2n})$—[Cy]—[Ph]—[Ph]—$C_mH_{2m+1}$
CPP-Vn-m $C_nH_{2n+1}$—CH=CH—$(C_mH_{2m})$—[Cy]—[Ph]—[Ph]—$C_lH_{2l+1}$
CPP-nVm-l $C_nH_{2n+1}$—[Cy]—[Ph]—[Ph]—[Cy]—$C_mH_{2m+1}$
CPPC-n-m $C_nH_{2n+1}$—[Cy]—[Ph(F)]—[Ph]—[Cy]—$C_mH_{2m+1}$
CGPC-n-m $C_nH_{2n+1}$—[Ph]—[Ph(F)]—[Ph]—$C_mH_{2m+1}$
PGP-n-m $C_nH_{2n+1}$—[Cy]—[Ph]—[Ph(F)]—[Ph]—$C_mH_{2m+1}$
CPGP-n-m $C_nH_{2n+1}$—[Cy]—[Cy]—[Ph]—$OCF_3$
CCP-n-OT $C_nH_{2n+1}$—[Cy]—[Cy]—[Ph(F)]—$OCF_3$
CCG-n-OT $C_nH_{2n+1}$—[Cy]—[Cy]—[Ph(F,F)]
CCG-n-F TABLE D-continued
Illustrative structures
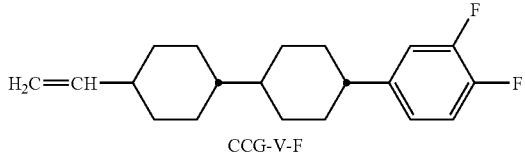
CCG-V-F
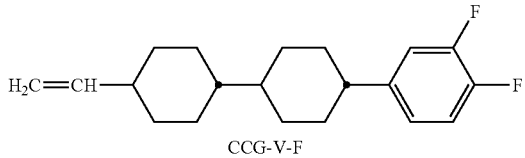
CCG-V-F
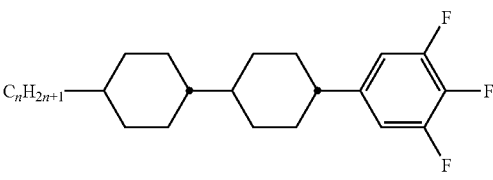
CCU-n-F
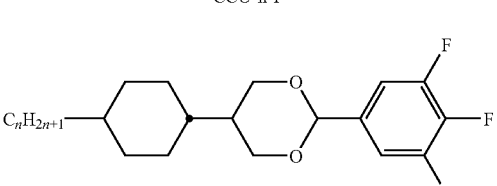
CDU-n-F
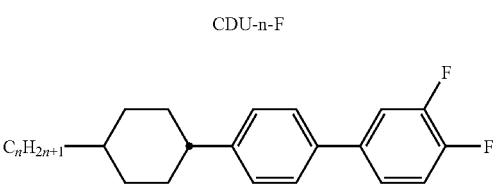
CPG-n-F
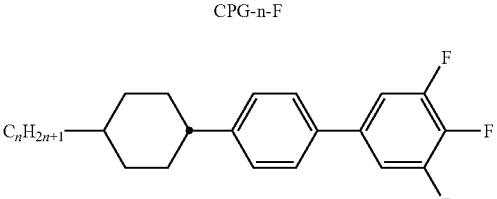
CPU-n-F
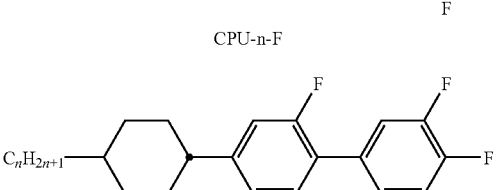
CGU-n-F
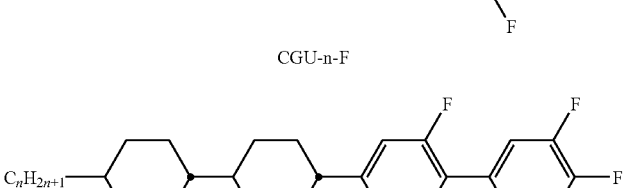
CCGU-n-F TABLE D-continued
Illustrative structures
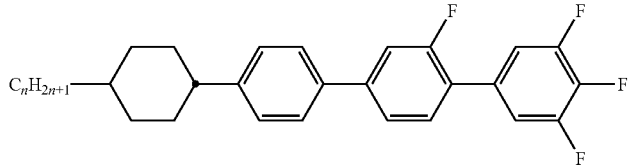
CPGU-n-F
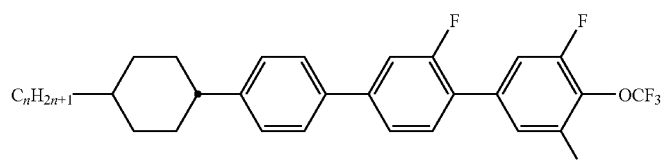
CPGU-n-OT
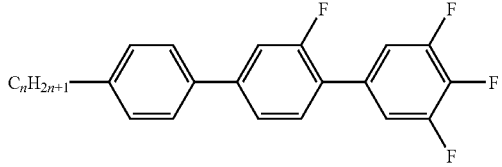
PGU-n-F
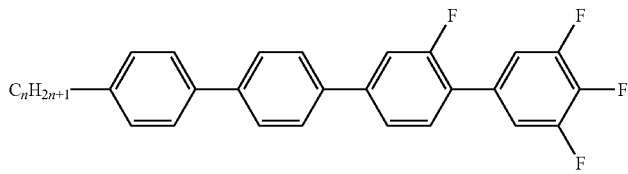
PPGU-n-F
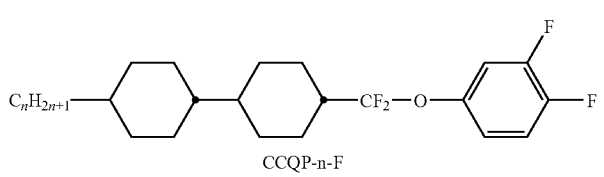
CCQP-n-F
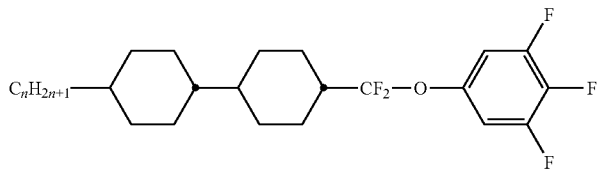
CCQU-n-F
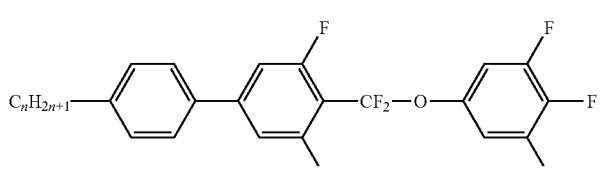
PUQU-n-F TABLE D-continued
Illustrative structures
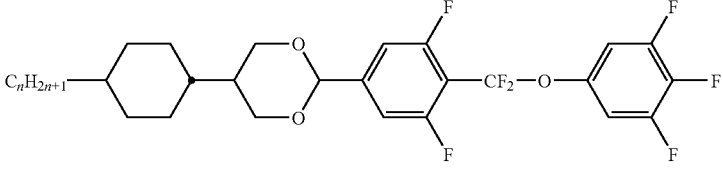
CDUQU-n-F
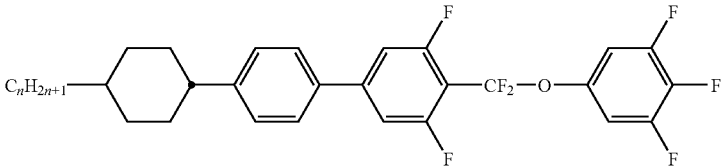
CPUQU-n-F
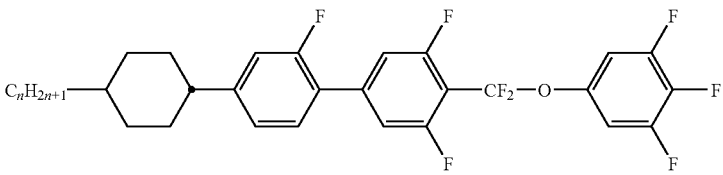
CGUQU-n-F
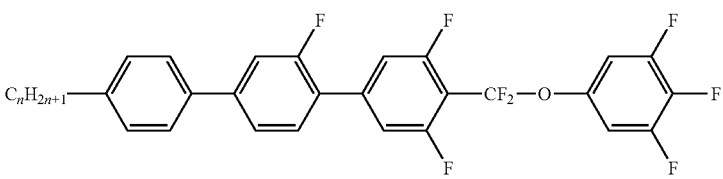
PGUQU-n-F
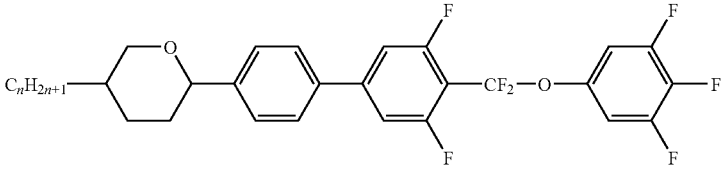
APUQU-n-F
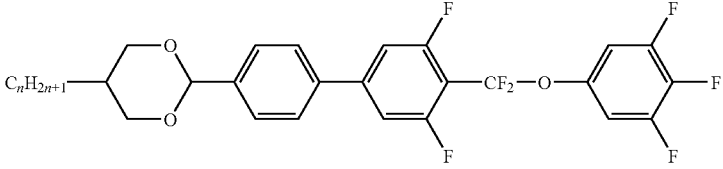
DPUQU-n-F
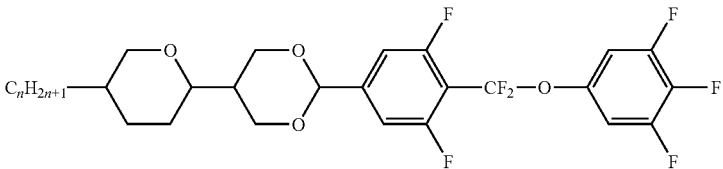
ADUQU-n-F TABLE D-continued
Illustrative structures
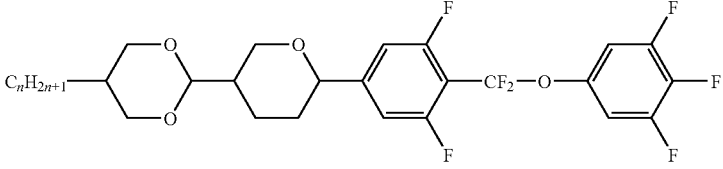
DAUQU-n-F
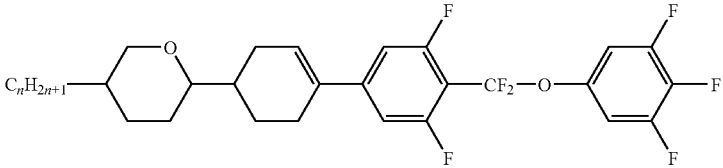
ALUQU-n-F
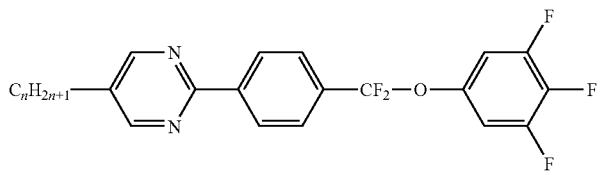
MPQU-n-F
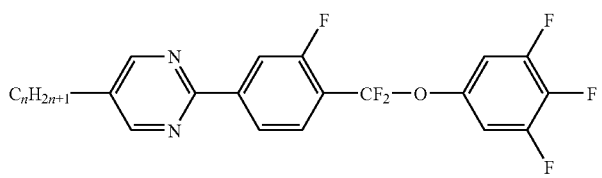
MGQU-n-F
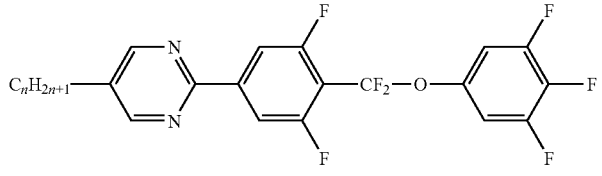
MUQU-n-F
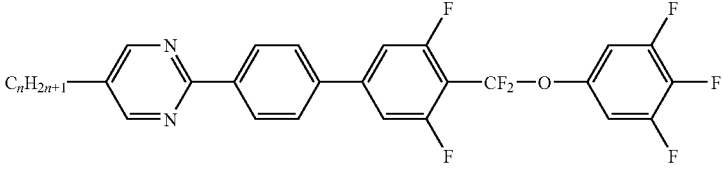
MPUQU-n-F
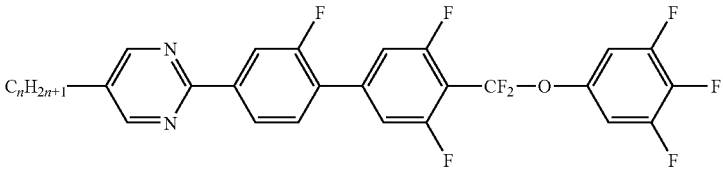
MGUQU-n-F TABLE D-continued
Illustrative structures
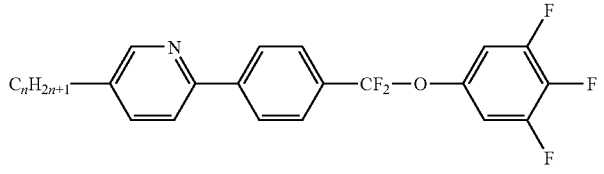
NPQU-n-F
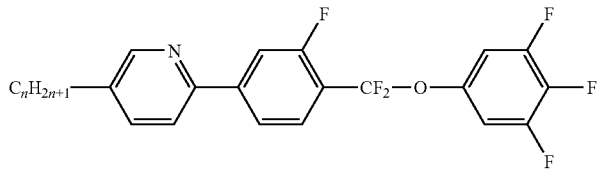
NGQU-n-F
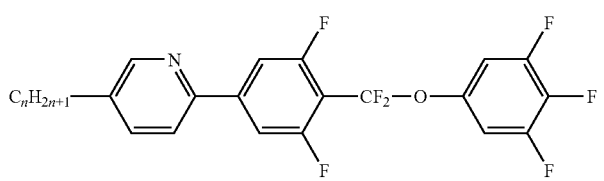
NUQU-n-F
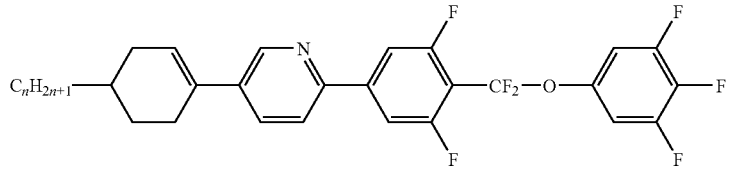
LNUQU-n-F
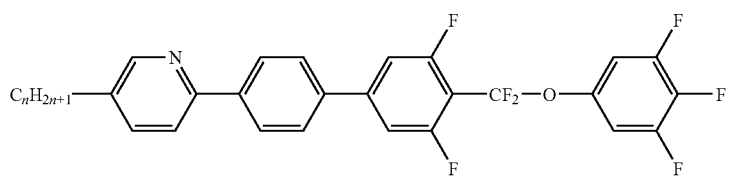
NPUQU-n-F
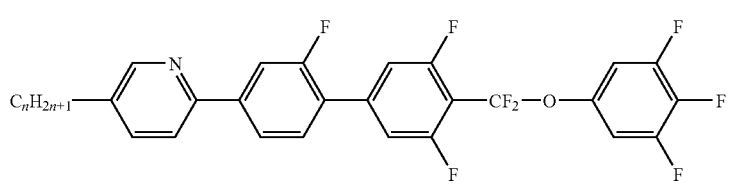
NGUQU-n-F
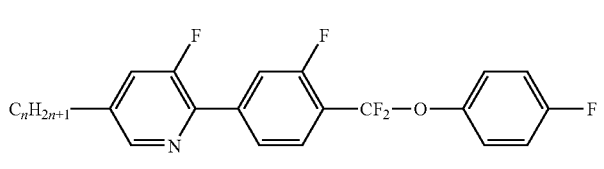
nfGQP-n-F TABLE D-continued
Illustrative structures
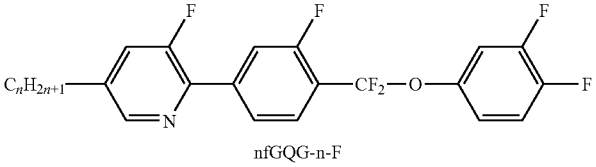
nfGQG-n-F
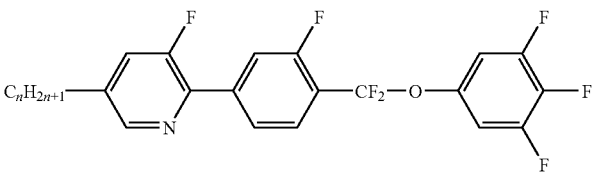
nfGQU-n-F
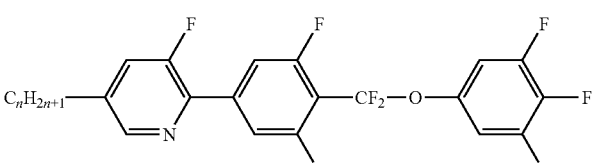
nfUQU-n-F
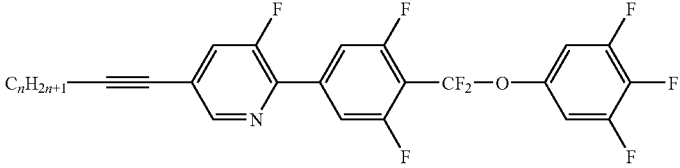
nfUQU-nA-F
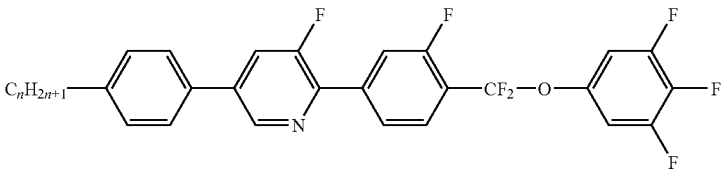
PnfGQU-n-F
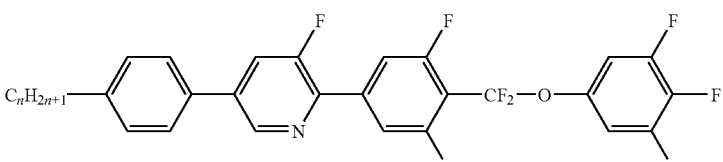
PnfUQU-n-F
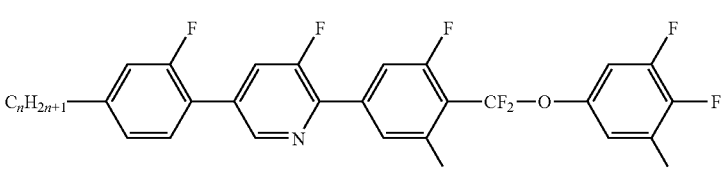
GnfUQU-n-F The following table, Table E, shows illustrative compounds which can be used as stabiliser in the mesogenic media according to the present invention.
TABLE E
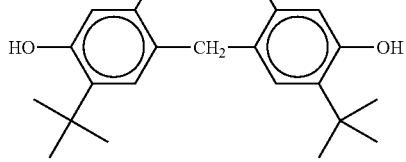
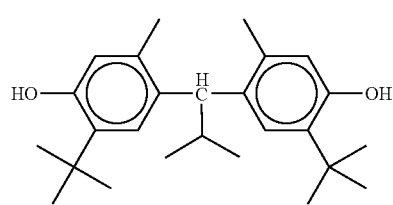
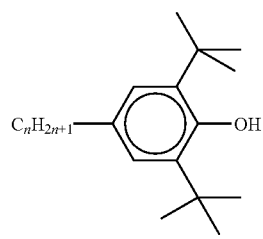
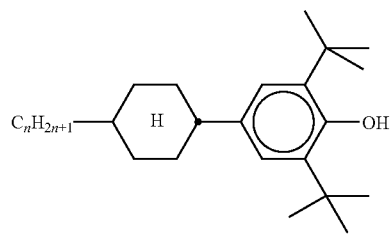
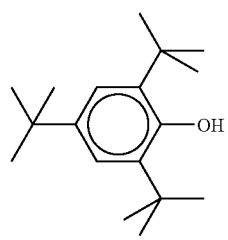
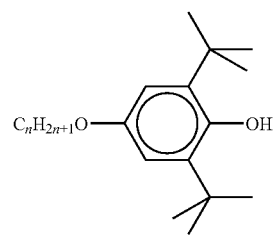
TABLE E-continued
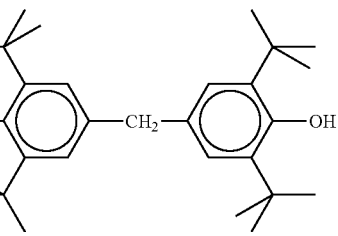
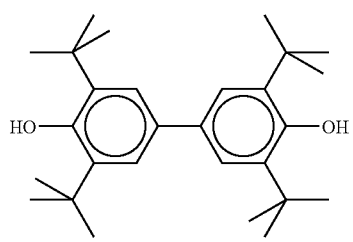
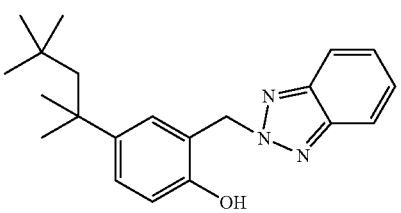
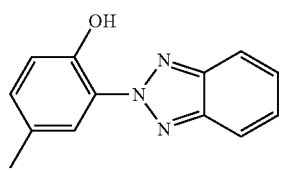
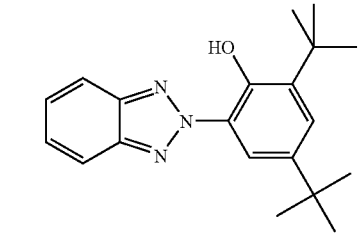
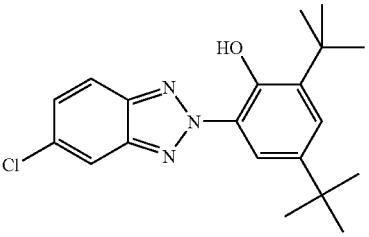

TABLE E-continued
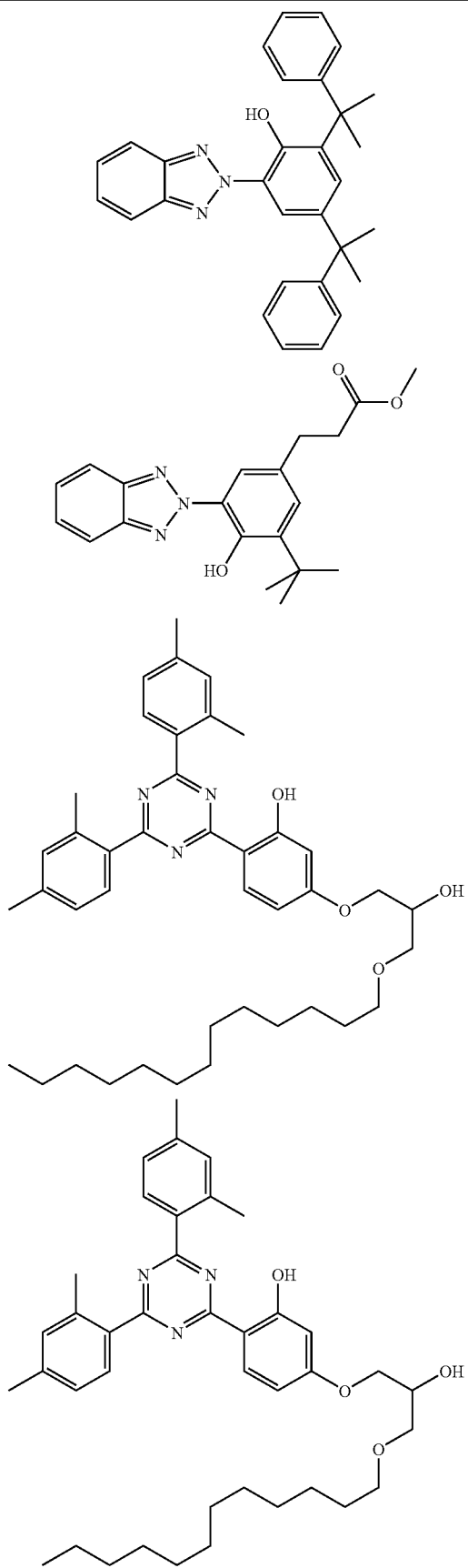
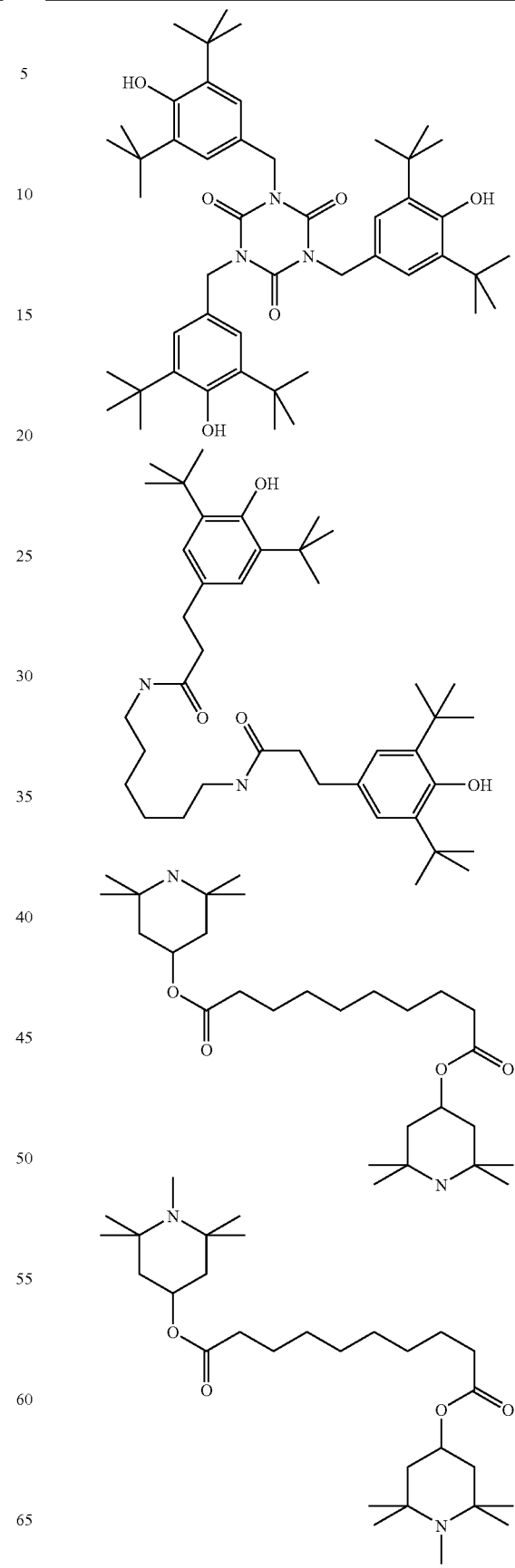

TABLE E-continued

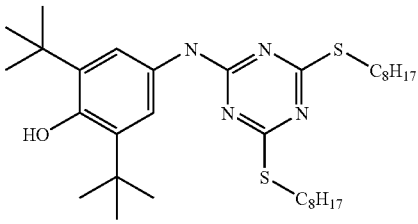

In a preferred embodiment of the present invention, the mesogenic media comprise one or more compounds selected from the group of the compounds from Table E.

The following table, Table F, shows illustrative compounds which can preferably be used as chiral dopants in the mesogenic media according to the present invention.

TABLE F

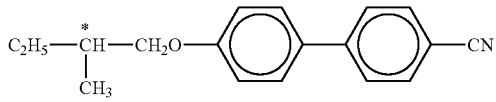

C 15

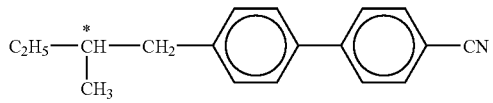

CB 15

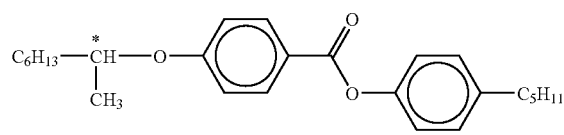

CM 21

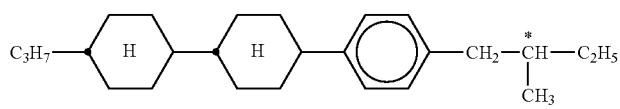

CM 44

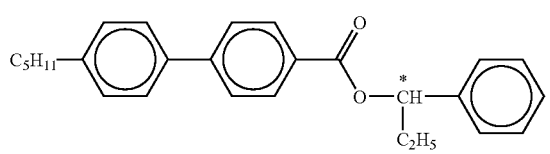

CM 45

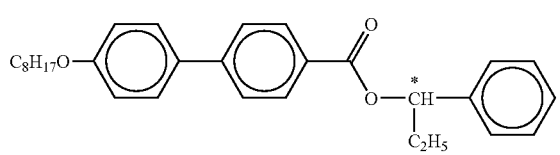

CM 474

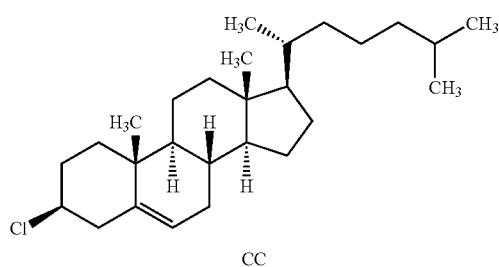

CC

TABLE F-continued
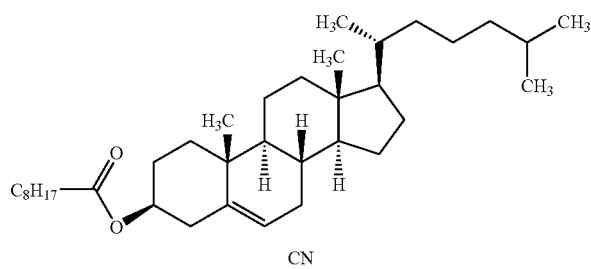
CN
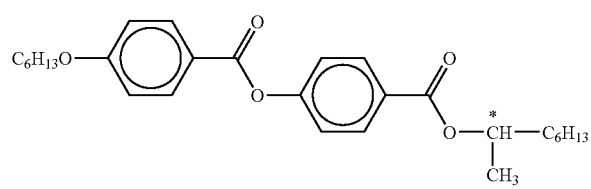
R/S-811
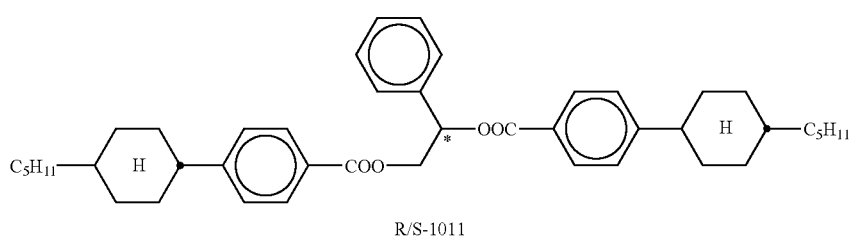
R/S-1011
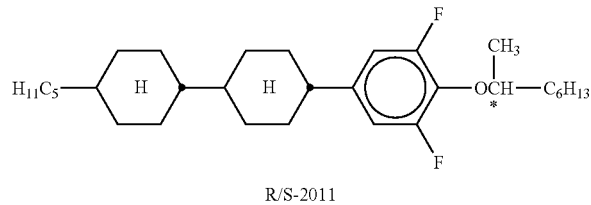
R/S-2011
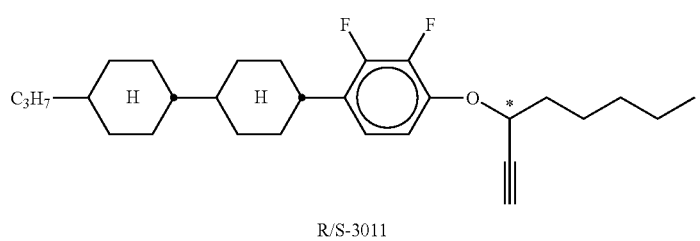
R/S-3011
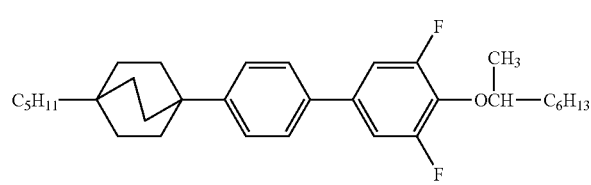
R/S-4011

TABLE F-continued

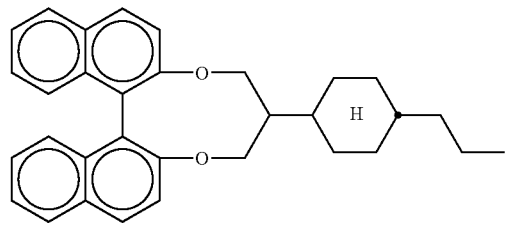

R/S-5011

In a preferred embodiment of the present invention, the mesogenic media comprise one or more compounds selected from the group of the compounds from Table F.

The mesogenic media according to the present application preferably comprise two or more, preferably four or more, compounds selected from the group consisting of the compounds from the above tables.

The liquid-crystal media according to the present invention preferably comprise seven or more, preferably eight or more, compounds, preferably having different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Example 1

A liquid-crystal mixture having the composition and properties as indicated in the following table is prepared.

| Composition Compound | | | |
|---|---|---|---|
| No. | Abbreviation | Conc./% | Physical properties |
| 1 | MUQU-3-F | 15.0 | |
| 2 | CCGU-3-F | 5.5 | |
| 3 | CC-3-V | 41.0 | |
| 4 | CC-3-V1 | 10.5 | |
| 5 | PP-1-2V1 | 3.0 | |
| 6 | CCP-V2-1 | 4.5 | |
| 7 | BCH-32 | 8.0 | |
| 8 | PGP-2-3 | 6.5 | |
| 9 | PGP-2-4 | 6.0 | |
| Σ | | 100.0 | |

This mixture is very highly suitable for displays operated in IPS or FFS mode.

Example 2

A liquid-crystal mixture having the composition and properties as indicated in the following table is prepared.

| Composition Compound | | | |
|---|---|---|---|
| No. | Abbreviation | Conc./% | Physical properties |
| 1 | MUQU-3-F | 10.0 | $T(N, I) = 74.5°$ C. |
| 2 | CDU-2-F | 2.0 | $n_e$ (20° C., 589.3 nm) = 1.5899 |
| 3 | PGU-2-F | 3.0 | $\Delta n$ (20° C., 589.3 nm) = 0.1028 |
| 4 | APUQU-2-F | 7.5 | $\epsilon_{\parallel}$ (20° C., 1 kHz) = 10.6 |
| 5 | APUQU-3-F | 2.5 | $\Delta\epsilon$ (20° C., 1 kHz) = 7.4 |
| 6 | CC-3-V | 48.5 | $\gamma_1$ (20° C.) = 52 mPa·s |
| 7 | CCP-V-1 | 15.0 | $k_1$ (20° C.) = 12.2 pN |
| 8 | PGP-2-3 | 5.0 | $k_3/k_1$ (20° C.) = 1.05 |
| 9 | PGP-2-4 | 5.0 | $V_0$ (20° C.) = 1.37 V |
| 10 | CPPC-3-3 | 1.5 | |
| Σ | | 100.0 | |

This mixture is very highly suitable for displays operated in IPS or FFS mode.

Example 3

A liquid-crystal mixture having the composition and properties as indicated in the following table is prepared.

| Composition Compound | | | |
|---|---|---|---|
| No. | Abbreviation | Conc./% | Physical properties |
| 1 | MUQU-2-F | 5.0 | $T(N, I) = 74.0°$ C. |
| 2 | MUQU-3-F | 5.0 | $n_e$ (20° C., 589.3 nm) = 1.5894 |
| 3 | CDU-2-F | 2.0 | $\Delta n$ (20° C., 589.3 nm) = 0.1023 |
| 4 | PGU-2-F | 3.0 | $\epsilon_{\parallel}$ (20° C., 1 kHz) = 10.7 |
| 5 | APUQU-2-F | 7.5 | $\Delta\epsilon$ (20° C., 1 kHz) = 7.4 |
| 6 | APUQU-3-F | 2.5 | |
| 7 | CC-3-V | 48.5 | $\gamma_1$ (20° C.) = 52 mPa·s |
| 8 | CCP-V-1 | 15.0 | $k_1$ (20° C.) = 12.2 pN |
| 9 | PGP-2-3 | 5.0 | $k_3/k_1$ (20° C.) = 1.04 |
| 10 | PGP-2-4 | 5.0 | $V_0$ (20° C.) = 1.35 V |
| 11 | CPPC-3-3 | 1.5 | |
| Σ | | 100.0 | |

This mixture is very highly suitable for displays operated in IPS or FFS mode.

Example 4

A liquid-crystal mixture having the composition and properties as indicated in the following table is prepared.

| Composition Compound | | | |
|---|---|---|---|
| No. | Abbreviation | Conc./% | Physical properties |
| 1 | MUQU-3-F | 9.0 | T(N, I) = 74.5° C. |
| 2 | CDU-2-F | 6.0 | $n_e$ (20° C., 589.3 nm) = 1.5867 |
| 3 | APUQU-2-F | 8.0 | $\Delta n$ (20° C., 589.3 nm) = 0.1021 |
| 4 | APUQU-3-F | 7.0 | $\epsilon_{\|\|}$ (20° C., 1 kHz) = 12.1 |
| 5 | CC-3-V | 49.5 | $\Delta\epsilon$ (20° C., 1 kHz) = 8.6 |
| 6 | CCP-V-1 | 6.0 | $\gamma_1$ (20° C.) = 58 mPa·s |
| 7 | PGP-2-3 | 6.0 | $k_1$ (20° C.) = 12.2 pN |
| 8 | PGP-2-4 | 5.0 | $k_3/k_1$ (20° C.) = 1.02 |
| 9 | CPPC-3-3 | 3.5 | $V_0$ (20° C.) = 1.25 V |
| Σ | | 100.0 | |

This mixture is very highly suitable for displays operated in IPS or FFS mode.

Example 5

A liquid-crystal mixture having the composition and properties as indicated in the following table is prepared.

| Composition Compound | | | |
|---|---|---|---|
| No. | Abbreviation | Conc./% | Physical properties |
| 1 | MUQU-2-F | 4.0 | T(N, I) = 74.5° C. |
| 2 | MUQU-3-F | 5.0 | $n_e$ (20° C., 589.3 nm) = 1.5863 |
| 3 | CDU-2-F | 6.0 | $\Delta n$ (20° C., 589.3 nm) = 0.1008 |
| 4 | APUQU-2-F | 8.0 | $\epsilon_{\|\|}$ (20° C., 1 kHz) = 12.2 |
| 5 | APUQU-3-F | 7.0 | $\Delta\epsilon$ (20° C., 1 kHz) = 8.7 |
| 6 | CC-3-V | 49.5 | $\gamma_1$ (20° C.) = 58 mPa·s |
| 7 | CCP-V-1 | 6.0 | $k_1$ (20° C.) = 12.1 pN |
| 8 | PGP-2-3 | 6.0 | $k_3/k_1$ (20° C.) = 1.03 |
| 9 | PGP-2-4 | 5.0 | $V_0$ (20° C.) = 1.25 V |
| 10 | CPPC-3-3 | 3.5 | |
| Σ | | 100.0 | |

This mixture is very highly suitable for displays operated in IPS or FFS mode.

Example 6

A liquid-crystal mixture having the composition and properties as indicated in the following table is prepared.

| Composition Compound | | | |
|---|---|---|---|
| No. | Abbreviation | Conc./% | Physical properties |
| 1 | MGUQU-5-F | 7.0 | T(N, I) = 79.0° C. |
| 2 | CCP-2-OT | 2.00 | $n_e$ (20° C., 589.3 nm) = 1.5959 |
| 3 | CCP-3-OT | 8.0 | $\Delta n$ (20° C., 589.3 nm) = 0.1103 |
| 4 | PGU-2-F | 9.0 | $\epsilon_{\|\|}$ (20° C., 1 kHz) = 14.1 |
| 5 | PGU-3-F | 2.0 | $\Delta\epsilon$ (20° C., 1 kHz) = 10.6 |
| 6 | PUQU-3-F | 18.0 | $\gamma_1$ (20° C.) = 73 mPa·s |
| 7 | CC-3-V | 22.0 | $k_1$ (20° C.) = 12.8 pN |
| 8 | CC-3-V1 | 12.0 | $k_3/k_1$ (20° C.) = 1.08 |
| 9 | CCP-V-1 | 11.0 | $V_0$ (20° C.) = 1.17 V |
| 10 | CCP-V2-1 | 9.0 | |
| Σ | | 100.0 | |

This mixture is very highly suitable for displays operated in IPS or FFS mode.

Example 7

A liquid-crystal mixture having the composition and properties as indicated in the following table is prepared.

| Composition Compound | | | |
|---|---|---|---|
| No. | Abbreviation | Conc./% | Physical properties |
| 1 | MPUQU-5-F | 7.0 | |
| 2 | CCP-2-OT | 2.00 | |
| 3 | CCP-3-OT | 8.0 | |
| 4 | PGU-2-F | 9.0 | |
| 5 | PGU-3-F | 2.0 | |
| 6 | PUQU-3-F | 18.0 | |
| 7 | CC-3-V | 22.0 | |
| 8 | CC-3-V1 | 12.0 | |
| 9 | CCP-V-1 | 11.0 | |
| 10 | CCP-V2-1 | 9.0 | |
| Σ | | 100.0 | |

This mixture is very highly suitable for displays operated in IPS or FFS mode.

Example 8

A liquid-crystal mixture having the composition and properties as indicated in the following table is prepared.

| Composition Compound | | | |
|---|---|---|---|
| No. | Abbreviation | Conc./% | Physical properties |
| 1 | NPQU-3-F | 15.0 | |
| 2 | CCGU-3-F | 5.5 | |
| 3 | CC-3-V | 41.0 | |
| 4 | CC-3-V1 | 10.5 | |
| 5 | PP-1-2V1 | 3.0 | |
| 6 | CCP-V2-1 | 4.5 | |
| 7 | BCH-32 | 8.0 | |
| 8 | PGP-2-3 | 6.5 | |
| 9 | PGP-2-4 | 6.0 | |
| Σ | | 100.0 | |

This mixture is very highly suitable for displays operated in IPS or FFS mode.

Example 9

A liquid-crystal mixture having the composition and properties as indicated in the following table is prepared.

| Composition Compound | | | |
|---|---|---|---|
| No. | Abbreviation | Conc./% | Physical properties |
| 1 | NPQU-2-F | 4.0 | |
| 2 | NPQU-3-F | 6.0 | |
| 3 | CDU-2-F | 2.0 | |
| 4 | PGU-2-F | 3.0 | |

-continued

| | Composition Compound | | |
|---|---|---|---|
| No. | Abbreviation | Conc./% | Physical properties |
| 5 | APUQU-2-F | 7.5 | |
| 6 | APUQU-3-F | 2.5 | |
| 7 | CC-3-V | 48.5 | |
| 8 | CCP-V-1 | 15.0 | |
| 9 | PGP-2-3 | 5.0 | |
| 10 | PGP-2-4 | 5.0 | |
| 11 | CPPC-3-3 | 1.5 | |
| Σ | | 100.0 | |

This mixture is very highly suitable for displays operated in IPS or FFS mode.

Example 10

A liquid-crystal mixture having the composition and properties as indicated in the following table is prepared.

| | Composition Compound | | |
|---|---|---|---|
| No. | Abbreviation | Conc./% | Physical properties |
| 1 | NUQU-1-F | 5.0 | |
| 2 | NUQU-2-F | 5.0 | |
| 3 | NUQU-3-F | 5.0 | |
| 4 | CCGU-3-F | 5.5 | |
| 5 | CC-3-V | 41.0 | |
| 6 | CC-3-V1 | 10.5 | |
| 7 | PP-1-2V1 | 3.0 | |
| 8 | CCP-V2-1 | 4.5 | |
| 9 | BCH-32 | 8.0 | |
| 10 | PGP-2-3 | 6.5 | |
| 11 | PGP-2-4 | 6.0 | |
| Σ | | 100.0 | |

This mixture is very highly suitable for displays operated in IPS or FFS mode.

Example 11

A liquid-crystal mixture having the composition and properties as indicated in the following table is prepared.

| | Composition Compound | | |
|---|---|---|---|
| No. | Abbreviation | Conc./% | Physical properties |
| 1 | NUQU-2-F | 3.0 | |
| 2 | NUQU-3-F | 7.0 | |
| 3 | CDU-2-F | 2.0 | |
| 4 | PGU-2-F | 3.0 | |
| 5 | APUQU-2-F | 7.5 | |
| 6 | APUQU-3-F | 2.5 | |
| 7 | CC-3-V | 48.5 | |
| 8 | CCP-V-1 | 15.0 | |
| 9 | PGP-2-3 | 5.0 | |
| 10 | PGP-2-4 | 5.0 | |
| 11 | CPPC-3-3 | 1.5 | |
| Σ | | 100.0 | |

This mixture is very highly suitable for displays operated in IPS or FFS mode.

Example 12

A liquid-crystal mixture having the composition and properties as indicated in the following table is prepared.

| | Composition Compound | | |
|---|---|---|---|
| No. | Abbreviation | Conc./% | Physical properties |
| 1 | NUQU-3 | 16.5 | $T(N, I) = 74.5°$ C. |
| 2 | APUQU-2-F | 5.5 | $n_e$ (20° C., 589.3 nm) = 1.5861 |
| 3 | APUQU-3-F | 3.0 | $\Delta n$ (20° C., 589.3 nm) = 0.1013 |
| 4 | CC-3-V | 43.0 | $\epsilon_\parallel$ (20° C., 1 kHz) = 10.7 |
| 5 | CC-3-V1 | 5.5 | $\Delta\epsilon$ (20° C., 1 kHz) = 7.3 |
| 6 | CCP-V-1 | 15.5 | $\gamma_1$ (20° C.) = 54 mPa·s |
| 7 | PGP-2-3 | 5.0 | $k_1$ (20° C.) = 12.5 pN |
| 8 | PGP-2-4 | 4.0 | $k_3/k_1$ (20° C.) = 1.06 |
| 9 | CPPC-3-3 | 2.0 | $V_0$ (20° C.) = 1.39 V |
| Σ | | 100.0 | |

This mixture is very highly suitable for displays operated in IPS or FFS mode.

Example 13

A liquid-crystal mixture having the composition and properties as indicated in the following table is prepared.

| | Composition Compound | | |
|---|---|---|---|
| No. | Abbreviation | Conc./% | Physical properties |
| 1 | LNUQU-2-F | 4.5 | $T(N, I) = 75.0°$ C. |
| 2 | LNUQU-3-F | 4.0 | $n_e$ (20° C., 589.3 nm) = 1.5861 |
| 3 | PGU-2-F | 7.5 | $\Delta n$ (20° C., 589.3 nm) = 0.1008 |
| 4 | CCQU-3-F | 4.0 | $\epsilon_\parallel$ (20° C., 1 kHz) = 11.6 |
| 5 | PUQU-3-F | 16.0 | $\Delta\epsilon$ (20° C., 1 kHz) = 8.3 |
| 6 | CC-3-V | 33.5 | $\gamma_1$ (20° C.) = 58 mPa·s |
| 7 | CC-3-V1 | 9.5 | $k_1$ (20° C.) = 12.3 pN |
| 8 | CCP-V-1 | 14.0 | $k_3/k_1$ (20° C.) = 1.13 |
| 9 | CCP-V2-1 | 7.0 | $V_0$ (20° C.) = 1.28 V |
| Σ | | 100.0 | |

This mixture is very highly suitable for displays operated in IPS or FFS mode.

Example 14

A liquid-crystal mixture having the composition and properties as indicated in the following table is prepared.

| | Composition Compound | | |
|---|---|---|---|
| No. | Abbreviation | Conc./% | Physical properties |
| 1 | nfUQU-3-F | 4.5 | $T(N, I) = 75.5°$ C. |
| 2 | APUQU-2-F | 8.0 | $n_e$ (20° C., 589.3 nm) = 1.5839 |
| 3 | APUQU-3-F | 8.0 | $\Delta n$ (20° C., 589.3 nm) = 0.1006 |
| 4 | PGUQU-3-F | 8.0 | $\epsilon_\parallel$ (20° C., 1 kHz) = 13.3 |
| 5 | CC-3-V | 49.0 | $\Delta\epsilon$ (20° C., 1 kHz) = 9.8 |

-continued

| No. | Abbreviation | Conc./% | Physical properties |
|---|---|---|---|
| 6 | CCP-V-1 | 15.0 | $\gamma_1$ (20° C.) = 59 mPa·s |
| 7 | PGP-2-3 | 4.0 | $k_1$ (20° C.) = 11.8 pN |
| Σ |  | 100.0 | $k_3/k_1$ (20° C.) = 1.16 |
|  |  |  | $V_0$ (20° C.) = 1.16 V |

This mixture is very highly suitable for displays operated in IPS or FFS mode.

Example 15

A liquid-crystal mixture having the composition and properties as indicated in the following table is prepared.

| No. | Abbreviation | Conc./% | Physical properties |
|---|---|---|---|
| 1 | nfUQU-3-F | 6.0 | T(N, I) = 74.5° C. |
| 2 | PGU-3-F | 2.0 | $n_e$ (20° C., 589.3 nm) = 1.5974 |
| 3 | APUQU-2-F | 8.0 | Δn (20° C., 589.3 nm) = 0.1112 |
| 4 | APUQU-3-F | 7.0 | $\epsilon_{\|\|}$ (20° C., 1 kHz) = 13.0 |
| 5 | PGUQU-3-F | 9.0 | Δε (20° C., 1 kHz) = 9.6 |
| 6 | CC-3-V | 48.0 | $\gamma_1$ (20° C.) = 60 mPa·s |
| 7 | CCP-V-1 | 10.0 | $k_1$ (20° C.) = 12.0 pN |
| 8 | PGP-2-3 | 5.0 | $k_3/k_1$ (20° C.) = 1.07 |
| 9 | PGP-2-4 | 5.0 | $V_0$ (20° C.) = 1.18 V |
| Σ |  | 100.0 |  |

This mixture is very highly suitable for displays operated in IPS or FFS mode.

Example 16

A liquid-crystal mixture having the composition and properties as indicated in the following table is prepared.

| No. | Abbreviation | Conc./% | Physical properties |
|---|---|---|---|
| 1 | PnfGQU-3-F | 8.0 | T(N, I) = 74.0° C. |
| 2 | PUQU-3-F | 8.0 | $n_e$ (20° C., 589.3 nm) = 1.5947 |
| 3 | APUQU-2-F | 5.0 | Δn (20° C., 589.3 nm) = 0.1100 |
| 4 | APUQU-3-F | 5.0 | $\epsilon_{\|\|}$ (20° C., 1 kHz) = 12.6 |
| 5 | PGUQU-3-F | 7.0 | Δε (20° C., 1 kHz) = 9.2 |
| 6 | CC-3-V | 50.0 | $\gamma_1$ (20° C.) = 56 mPa·s |
| 7 | CCP-V-1 | 10.0 | $k_1$ (20° C.) = 12.1 pN |
| 8 | PGP-2-3 | 4.0 | $k_3/k_1$ (20° C.) = 1.12 |
| 9 | PGP-2-4 | 3.0 | $V_0$ (20° C.) = 1.19 V |
| Σ |  | 100.0 |  |

This mixture is very highly suitable for displays operated in IPS or FFS mode.

Example 17

A liquid-crystal mixture having the composition and properties as indicated in the following table is prepared.

| No. | Abbreviation | Conc./% | Physical properties |
|---|---|---|---|
| 1 | PnfUQU-3-F | 8.0 | T(N, I) = 74.0° C. |
| 2 | PUQU-3-F | 6.0 | $n_e$ (20° C., 589.3 nm) = 1.5951 |
| 3 | APUQU-2-F | 4.0 | Δn (20° C., 589.3 nm) = 0.1095 |
| 4 | APUQU-3-F | 5.0 | $\epsilon_{\|\|}$ (20° C., 1 kHz) = 12.4 |
| 5 | PGUQU-3-F | 8.0 | Δε (20° C., 1 kHz) = 9.1 |
| 6 | CC-3-V | 51.0 | $\gamma_1$ (20° C.) = 55 mPa·s |
| 7 | CCP-V-1 | 10.0 | $k_1$ (20° C.) = 12.0 pN |
| 8 | PGP-2-3 | 4.0 | $k_3/k_1$ (20° C.) = 1.09 |
| 9 | PGP-2-4 | 4.0 | $V_0$ (20° C.) = 1.20 V |
| Σ |  | 100.0 |  |

This mixture is very highly suitable for displays operated in IPS or FFS mode.

Example 18

A liquid-crystal mixture having the composition and properties as indicated in the following table is prepared.

| No. | Abbreviation | Conc./% | Physical properties |
|---|---|---|---|
| 1 | GnfUQU-3-F | 8.0 | T(N, I) = 73.5° C. |
| 2 | PUQU-3-F | 5.0 | $n_e$ (20° C., 589.3 nm) = 1.5955 |
| 3 | APUQU-2-F | 5.0 | Δn (20° C., 589.3 nm) = 0.1098 |
| 4 | APUQU-3-F | 4.0 | $\epsilon_{\|\|}$ (20° C., 1 kHz) = 12.3 |
| 5 | PGUQU-3-F | 8.0 | Δε (20° C., 1 kHz) = 9.0 |
| 6 | CC-3-V | 51.0 | $\gamma_1$ (20° C.) = 55 mPa·s |
| 7 | CCP-V-1 | 10.0 | $k_1$ (20° C.) = 11.9 pN |
| 8 | PGP-2-3 | 4.0 | $k_3/k_1$ (20° C.) = 1.11 |
| 9 | PGP-2-4 | 5.0 | $V_0$ (20° C.) = 1.20 V |
| Σ |  | 100.0 |  |

This mixture is very highly suitable for displays operated in IPS or FFS mode.

The invention claimed is:
1. A liquid-crystal medium, comprising:
a dielectrically positive component, component A, comprising one or more dielectrically positive compounds selected from the group of the compounds of the formulae I'A-1, I'A-2, I"A-1, I"A-2, I'''A-1 and I'''A-2:

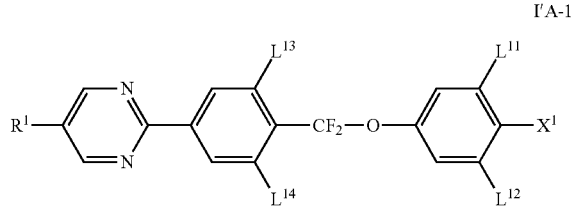

I'A-1

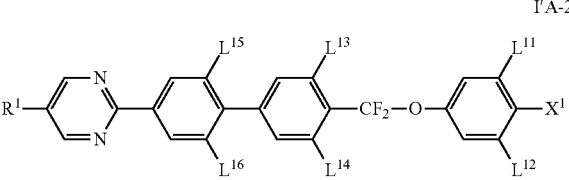

I'A-2

-continued

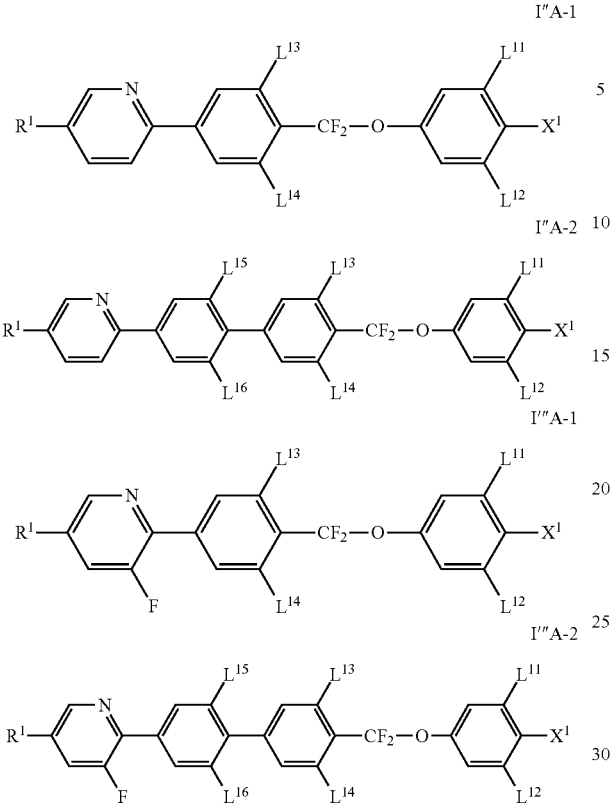

in which
R¹ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,
X¹ denotes —CN, halogen, halogenated alkyl or halogenated alkoxy having 1 to 3 C atoms or halogenated alkenyl or halogenated alkenyloxy having 2 or 3 C atoms, and
$L^{11}$ to $L^{16}$, independently of one another, denote H or F;
and comprising a dielectrically neutral component, component D, comprising one or more dielectrically neutral compounds of the formula VI

in which
$R^{61}$ and $R^{62}$, independently of one another, have the meaning indicated for R¹ under formula I,

and if it occurs twice, independently of one another on each occurrence, denotes

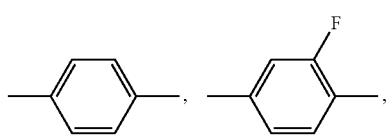

-continued

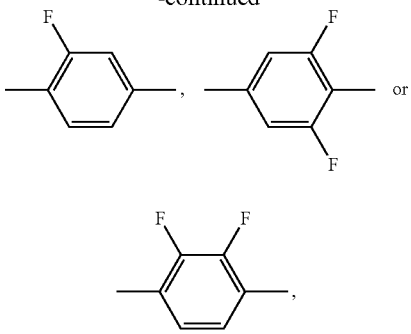

$Z^{61}$ and $Z^{62}$, independently of one another and, if $Z^{61}$ is present twice, also these independently of one another, denote
—CH₂CH₂—, —COO—, trans-CH═CH—, trans-CF═CF—,
—CH₂O— —CF₂O— or a single bond, and
r denotes 1 or 2.

2. Liquid-crystal medium according to claim 1, further comprising:
a second dielectrically positive component, component B, comprising one or more dielectrically positive compounds, selected from the group of the compounds of the formulae II and III:

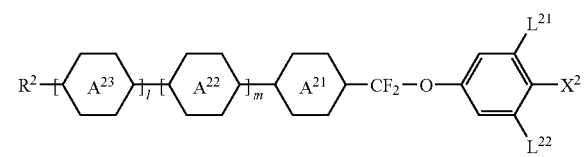

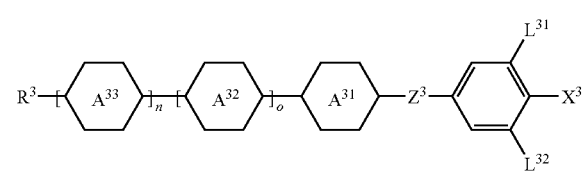

in which
R² and R³, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

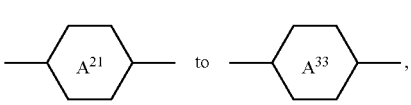

independently of one another, denote

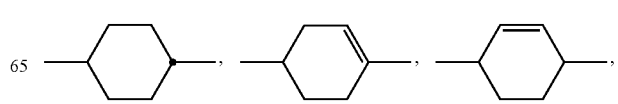

-continued

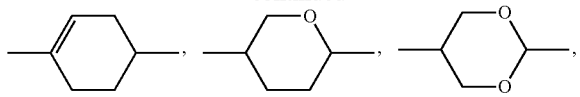

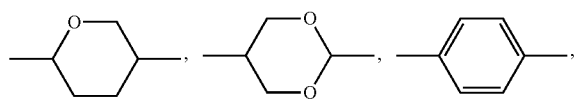

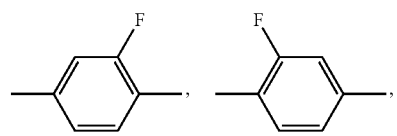

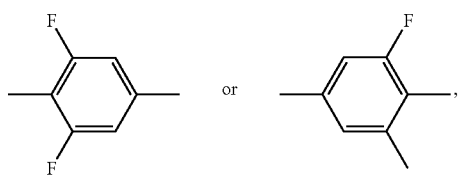

$L^{21}$, $L^{22}$, $L^{31}$ and $L^{32}$, independently of one another, denote H or F, $X^2$ and $X^3$, independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and l, m, n and o, independently of one another, denote 0 or 1.

3. Liquid-crystal medium according to claim 1, further comprising:
a dielectrically neutral component, component C, comprising one or more dielectrically neutral compounds of the formula IV

IV

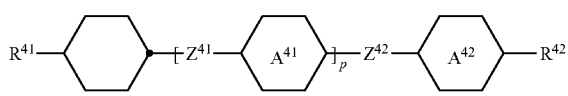

in which
$R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

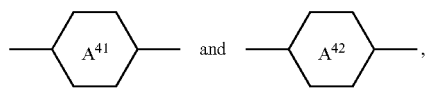

independently of one another and, in the case where

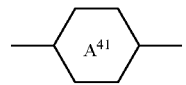

is present twice, also these independently of one another, denote

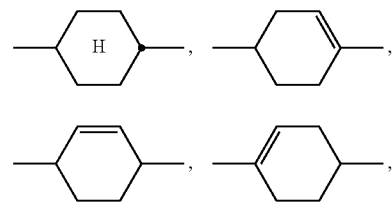

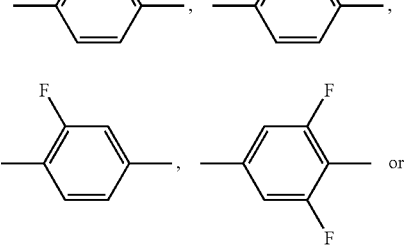

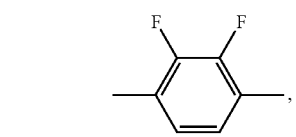

$Z^{41}$ and $Z^{42}$, independently of one another and, in the case where $Z^{41}$ is present twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

4. Liquid-crystal medium according claim 1, wherein the concentration of component A in the medium is in the range from 1% to 50%.

5. Liquid-crystal medium according claim 1, wherein component A comprises one or more compounds of the formulae I'A-1, I'A-2, I" A-1, I"A-2, I'''A-1 or I'''A-2 in which $X^1$ denotes F.

6. Liquid-crystal medium according claim 2, which comprises one or more compounds of the formula II as indicated in claim 2.

7. Liquid-crystal medium according claim 2, which comprises one or more compounds of the formula III as indicated in claim 2.

8. Liquid-crystal medium according claim 3, which comprises one or more dielectrically neutral compounds of the formula IV as indicated in claim 3.

9. A liquid-crystal medium, comprising:
a dielectrically positive component, component A, comprising one or more dielectrically positive compounds of the formula I

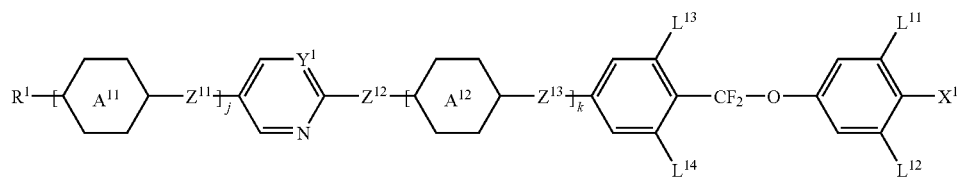

in which
R¹ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,
X¹ denotes —CN, halogen, halogenated alkyl or halogenated alkoxy having 1 to 3 C atoms or halogenated alkenyl or halogenated alkenyloxy having 2 or 3 C atoms,
Y¹ denotes =N—, =(CH)— or =(CF)—,

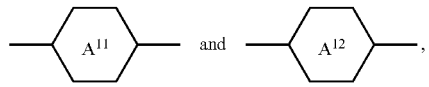

independently of one another and, if
the rings A¹¹ and/or A¹² are present more than once, also these independently of one another, denote

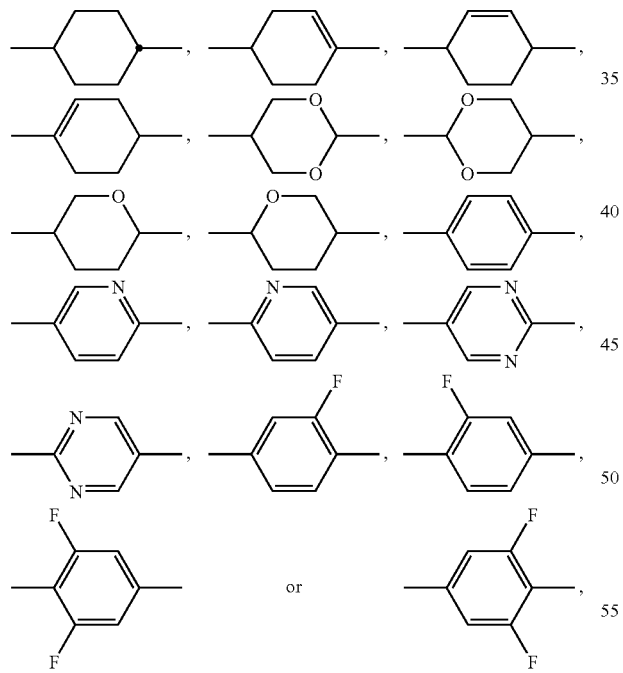

Z¹¹ to Z¹³, independently of one another and, if Z¹¹ and/or Z¹³ are present more than once, also these independently of one another, denote —CH₂CH₂—, —CF₂CF₂—, —COO—, trans-CH=CH—, trans-CF=CF—, —CF₂O—, —CH₂O— or a single bond,
L¹¹ to L¹⁴, independently of one another, denote H or F, and
j and k, independently of one another, denote 0, 1 or 2, but where (j+k) denotes 0, 1 or 2;

a second dielectrically positive component, component B, comprising one or more dielectrically positive compounds, selected from the group of the compounds of the formulae II and III:

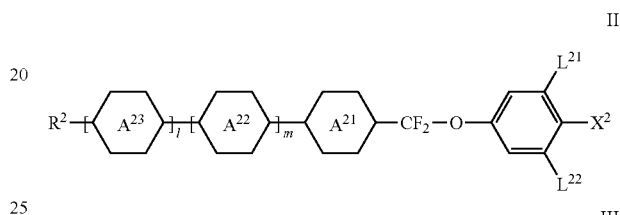

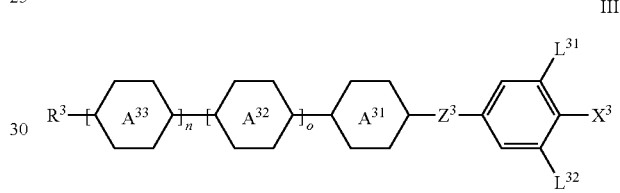

in which
R² and R³, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

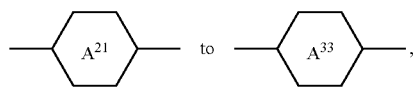

independently of one another, denote

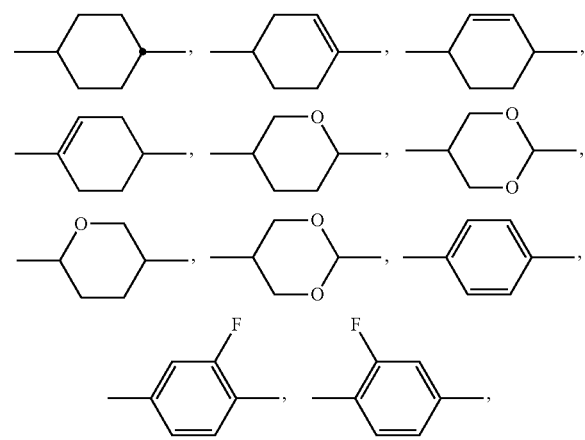

-continued

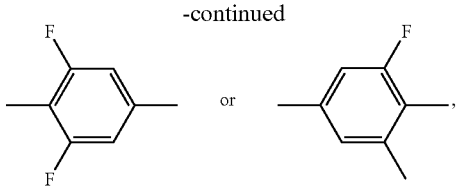

$L^{21}$, $L^{22}$, $L^{31}$ and $L^{32}$, independently of one another, denote H or F, $X^2$ and $X^3$, independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and l, m, n and o, independently of one another, denote 0 or 1; and a dielectrically neutral component, component D, comprising one or more dielectrically neutral compounds of the formula VI

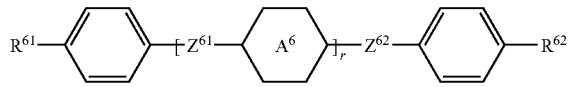
VI in which $R^{61}$ and $R^{62}$, independently of one another, have the meaning indicated for $R^2$ under formula II,

and if it occurs twice, independently of one another on each occurrence, denotes

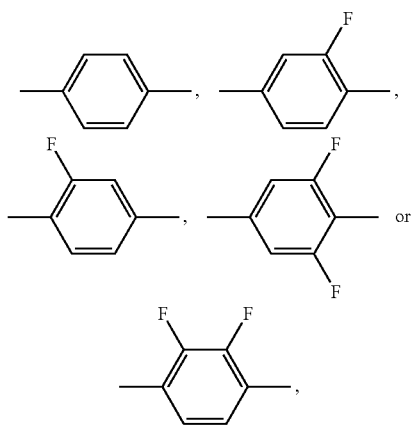

$Z^{61}$ and $Z^{62}$, independently of one another and, if $Z^{61}$ is present twice, also these independently of one another, denote —CH$_2$CH$_2$—, —COO—, trans-CH=CH—, trans-CF=CF—, —CH$_2$O—, —CF$_2$O— or a single bond, and r denotes 1 or 2.

10. Liquid-crystal display, comprising a liquid crystal display which contains a liquid-crystal medium according to claim 1.

11. Liquid-crystal display according to claim 10, which is addressed by an active matrix.

12. Liquid-crystal medium according to claim 2, further comprising:

a dielectrically neutral component, component C, comprising one or more dielectrically neutral compounds of the formula IV

IV in which $R^{41}$ and $R^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

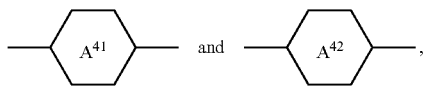

independently of one another and, in the case where

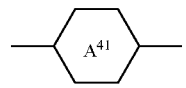

is present twice, also these independently of one another, denote

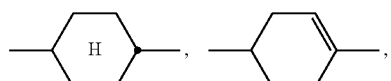
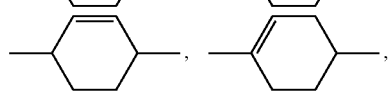
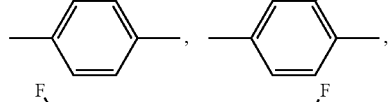
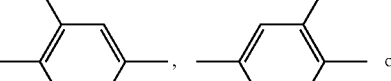

$Z^{41}$ and $Z^{42}$, independently of one another and, in the case where $Z^{41}$ is present twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

13. Liquid-crystal display, comprising a liquid crystal display which contains a liquid-crystal medium according to claim 9.

14. Liquid-crystal display according to claim 13, which is addressed by an active matrix.

15. Liquid-crystal medium according to claim 1, which comprises at least one compound of the formula I'A-1.

16. Liquid-crystal medium according to claim 1, which comprises at least one compound of the formula I"A-1.

17. Liquid-crystal display medium according to claim 1, which comprises at least one compound of the formula I'''A-1.

18. Liquid-crystal medium according to claim 1, wherein the dielectrically positive component, component A, comprises one or more dielectrically positive compounds selected from the group of the compounds of the formulae I'A-1, I"A-1, I'''A-1 and I'''A-2.

19. Liquid-crystal medium according to claim 1, which comprises a compound of the formula VI wherein r is 1.

20. Liquid-crystal medium according to claim 9, which comprises a compound of the formula VI wherein r is 1.

* * * * *